US010217256B2

(12) United States Patent
de Castro Alves et al.

(10) Patent No.: US 10,217,256 B2
(45) Date of Patent: *Feb. 26, 2019

(54) VISUALLY EXPLORING AND ANALYZING EVENT STREAMS

(71) Applicant: Oracle International Corporation, Redwood Shores, CA (US)

(72) Inventors: Alexandre de Castro Alves, Doral, FL (US); Prabhu Thukkaram, San Ramon, CA (US); Dmitrii Markovskii, Pleasanton, CA (US); Ilya Shikalov, St. Petersburg (RU); Vitaly Bychkov, Foster City, CA (US); Natalia Nikiforova, St. Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,037

(22) Filed: Mar. 26, 2018

(65) Prior Publication Data

US 2018/0218522 A1    Aug. 2, 2018

Related U.S. Application Data

(63) Continuation of application No. 14/866,512, filed on Sep. 25, 2015, now Pat. No. 9,972,103, which is a continuation of application No. PCT/RU2015/000468, filed on Jul. 24, 2015.

(51) Int. Cl.
*G06F 17/30* (2006.01)
*G06T 11/20* (2006.01)

(52) U.S. Cl.
CPC ...... *G06T 11/206* (2013.01); *G06F 17/30516* (2013.01); *G06F 17/30572* (2013.01); *G06F 17/30958* (2013.01)

(58) Field of Classification Search
None
See application file for complete search history.

(56) References Cited

U.S. PATENT DOCUMENTS 7,139,977 B1    11/2006  Russell
9,972,103 B2     5/2018  De Castro Alves et al.
(Continued)

FOREIGN PATENT DOCUMENTS

WO    2017018901    2/2017

OTHER PUBLICATIONS

Sadana ("Interactive Scatterplot for Tablets", 2014, AVI, https://vimeo.com/97798460).*
(Continued)

*Primary Examiner* — Xin Sheng
(74) *Attorney, Agent, or Firm* — Kilpatrick Townsend & Stockton LLP

(57) ABSTRACT

Some event ordering requirements can be determined based on continuous event processing queries. Other event ordering requirements can be determined based on distribution flow types being used to distribute events from event streams to node executing the queries. Events from event streams can be ordered according to ordering semantics that are based on a combination of all of these event ordering requirements. Additionally, virtual computing nodes can be associated with constraints, and computing processors can be associated with capabilities. Virtual computing nodes for processing event streams can be assigned to execute on various computing processors based on both these constraints and capabilities. Additionally, for each of several events in an event stream, a ratio between a total latency and a communication latency can be for determined. Based on an average of these ratios, a quantity of reducing nodes that will be involved in a map-reduce operation can be selected.

20 Claims, 19 Drawing Sheets

| ROW KEY | NAME | GENDER | DATABASE | ALGORITHMS |
|---|---|---|---|---|
| yogesh@buffalo.edu | Yogesh | male | A+ | A- |
| suresh@buffalo.edu | Suresh | male | A- | B+ |

(56) References Cited

U.S. PATENT DOCUMENTS

| | | | | |
|---|---|---|---|---|
| 2007/0168154 | A1* | 7/2007 | Ericson | G06K 9/6247 |
| | | | | 702/179 |
| 2008/0165127 | A1 | 7/2008 | Eom | |
| 2009/0070786 | A1 | 3/2009 | De Castro Alves et al. | |
| 2010/0022627 | A1* | 1/2010 | Scherer | C12Q 1/6883 |
| | | | | 514/44 R |
| 2011/0084967 | A1* | 4/2011 | De Pauw | G06F 3/0481 |
| | | | | 345/440 |
| 2014/0059109 | A1* | 2/2014 | Jugel | G06F 9/5027 |
| | | | | 709/201 |
| 2014/0095425 | A1* | 4/2014 | Sipple | G06N 7/005 |
| | | | | 706/52 |
| 2017/0024912 | A1 | 1/2017 | De Castro Alves et al. | |

OTHER PUBLICATIONS

U.S. Appl. No. 14/866,512, Final Office Action dated Sep. 13, 2017, 25 pages.

U.S. Appl. No. 14/866,512, Non-Final Office Action dated Apr. 10, 2017, 24 pages.

U.S. Appl. No. 14/866,512, Notice of Allowance dated Feb. 15, 2018, 5 pages.

Sadana, Interactive Scatterplot for Tablets, AVI, Available Online at https://vimeo.com/97798460, 2 pages, 2014.

Arasu et al., The CQL Continuous Query Language: Semantic Foundations and Query Execution, The VLDB Journal, vol. 15, Issue 2, pp. 121-142, Jun. 2006.

Cooperative Systems et al., Combined WLAN and Inertial Indoor Pedestrian Positioning System, Available online at https://www.youtube.com/watch?v=mEt88WaHZvU, 2 pages, Nov. 15, 2010.

Frank et al., Development and Evaluation of a Combined WLAN & Inertial Indoor Pedestrian Positioning System, Proceedings of the 22nd International Technical Meeting of the Satellite Division of the Institute of Navigation (ION GNSS 2009), Sep. 25, 2009, pp. 538-546.

International Application No. PCT/RU2015/000468, International Preliminary Report on Patentability dated Feb. 8, 2018, 10 pages.

International Application No. PCT/RU2015/000468, International Search Report and Written Opinion dated Apr. 25, 2016, 11 pages.

\* cited by examiner

1300

1500

VISUALLY EXPLORING AND ANALYZING EVENT STREAMS

CROSS-REFERENCES TO RELATED APPLICATIONS

This present application is a continuation of, and claims the benefit and priority of continuation application Ser. No. 14/866,512, filed Sep. 25, 2015, entitled VISUALLY EXPLORING AND ANALYZING EVENT STREAMS now U.S. Pat. No. 9,972,103, which claims the benefit and priority of International Application No. PCT/RU2015/000468, filed Jul. 24, 2015, the entire contents of which are incorporated herein by reference for all purposes.

BACKGROUND

Databases have traditionally been used in applications that require storage of data and querying capability on the stored data. Existing databases are thus best equipped to run queries over finite stored data sets. However, the traditional database model is not well suited for a growing number of modern applications in which data is received as a stream of data events instead of a bounded data set. A data stream, also referred to as an event stream, is characterized by a real-time, potentially continuous, sequence of events. A data or event stream thus represents unbounded sets of data. Examples of sources that generate data streams include sensors and probes (e.g., radio frequency identifier (RFID) sensors, temperature sensors, etc.) configured to send a sequence of sensor readings, financial tickers, network monitoring and traffic management applications sending network status updates, click stream analysis tools, and others.

Continuous event processing (CEP) is a technology useful for processing data in an event stream. CEP is highly stateful. CEP involves receiving events continuously, and finding some pattern among those events. A significant amount of state maintenance is therefore involved in CEP. Because CEP involves the maintenance of so much state, processes which apply CEP queries to data within an event stream have always been single-threaded. In computer programming, single-threading is the processing of one command at a time.

CEP query processing generally involves the continuous execution of a query relative to events that are specified within an event stream. For example, CEP query processing might be used in order to continuously observe the average price of a stock over the most recent hour. Under such circumstances, CEP query processing can be performed relative to an event stream that contained events that each indicated the current price of the stock at various times. The query can aggregate the stock prices over the last hour and then calculate the average of those stock prices. The query can output each calculated average. As the hour-long window of prices moves, the query can be executed continuously, and the query can output various different average stock prices.

A continuous event processor is capable of receiving a continuous stream of events and processing each event contained therein by applying a CEP query to that event. Such a CEP query may be formatted in conformance to the syntax of a CEP query language such as the continuous query language (CQL), which is an extension of the structured query language (SQL). Whereas SQL queries are often applied once (per user request) to data that has already been stored in the tables of a relational database, CQL queries are applied repeatedly to events in an incoming event stream as those events are received by the continuous event processor.

BRIEF SUMMARY

Embodiments described herein relate to databases and continuous event processing. According to some embodiments, the processing of CQL queries can be distributed across disparate processing nodes. An event processing mechanism can be distributed across multiple separate virtual machines.

According to some embodiments, an HBase database store is used as data source for a CQL processor. This use allows events to be enriched by data that exists in this store, similar to how events can be enriched with data that exists in a RDBMS table. According to some embodiments, an HBase database store is used as a data sink similar to a table sink feature.

The foregoing, together with other features and embodiments will become more apparent upon referring to the following specification, claims, and accompanying drawings.

DETAILED DESCRIPTION

Figure 1:
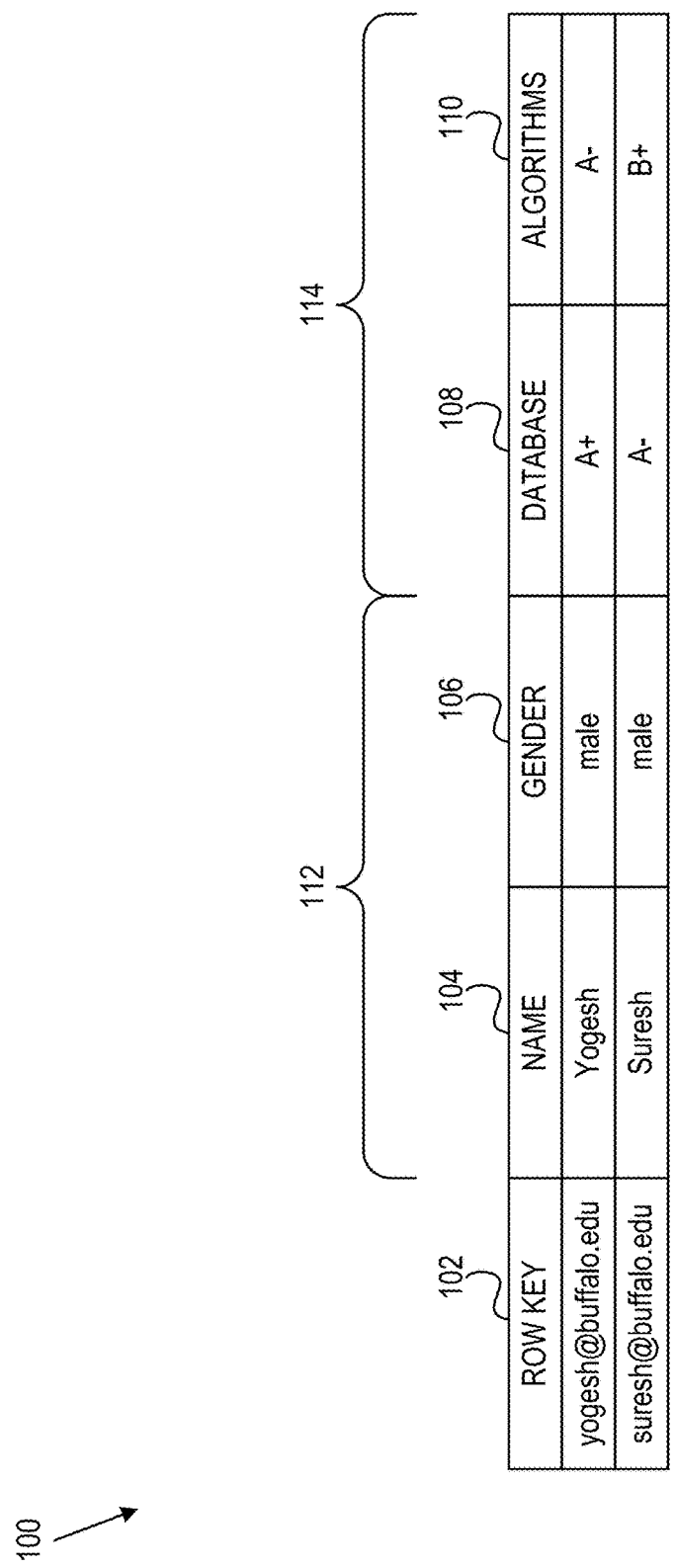
FIG. 1 is a diagram that illustrates an example of a table in an HBase data store, according to some embodiments.

In the following description, for the purposes of explanation, specific details are set forth in order to provide a thorough understanding of embodiments of the invention. However, it will be apparent that the invention may be practiced without these specific details.

Processing for event processing applications can be distributed. The Oracle Event Processing product is an example of an event processor. According to some embodiments, the processing of CQL queries can be distributed across disparate processing nodes. Each such processing node may be a separate machine or computing device, for example. When distributing the processing of CQL queries across disparate processing nodes, the semantics of ordering events are defined in some manner.

A rudimentary approach for ordering events attempts to maintain a first in, first out (FIFO) ordering among events in an event stream. However, some event streaming systems can involve multiple event publishers and multiple event consumers. Each machine in the system can have its own clock. Under such circumstances, the event timestamps produced by any single machine might not be definitive throughout the whole system.

Within a system that involves multiple event consumers, each consumer might have a separate set of requirements. Each consumer can be an event processor continuously executing CQL queries. Each such CQL query can have a separate requirement in terms of event ordering.

According to some embodiments, distribution flows are defined. Each distribution flow is a particular way of distributing events between event producers and event consumers. One kind of distribution flow can load-balance events among a set of event consumers. For example, when an event producer produces a first event, a load-balancing distribution flow can cause that first event to be routed to a first event consumer. Subsequently, when the event producer produces a second event, the load-balancing distribution flow can cause that second event to be routed to a second event consumer.

Other kinds of distribution flows include a partition distribution flow, a fan-in distribution flow, a broadcast flow, etc. Depending on the type of distribution flow being used, and also depending on the requirements of the event consumer that is receiving events, a different event ordering technique may be used to order the events that the event consumer receives.

Map-Reduce Overview

Reference is made herein to Map-Reduce, which is a framework for processing parallelizable problems involving huge datasets using a large number of computing machines (nodes). The nodes are collectively referred to as a cluster if all nodes are on the same local network and use similar hardware. Alternatively, the nodes are collectively referred to as a grid if the nodes are shared across geographically and administratively distributed systems, and use more heterogeneous hardware. Computational processing can be performed relative to unstructured data, such as might be found in a file system, or structured data, such as might be found in a database. Map-Reduce can take advantage of locality of data, processing the data on or near the storage assets in order to reduce the distance over which the data are transmitted.

In a "map" step, a master node receives a task as input, divides the input into smaller sub-problems, and distributes the sub-problems to worker nodes. A given worker node can repeat this division and distribution, leading to a multi-level tree structure. Each worker node processes the sub-problem assigned to it, and passes the result of the processing back to its master node.

In a "reduce" step, the master node the collects the results of the processing of all of the sub-problems. The master node combines the results in some way to form the final output. The final output is the product of the task that the master node was originally given to perform.

Map-Reduce allows for the distributed processing of the map and reduction operations. Provided that each mapping operation is independent of the others, all mapping operations can be performed in parallel. Similarly, a set of reducing nodes can perform the reduction phase if all outputs of the map operation that share the same key are presented to the same reducer at the same time, or if the reduction function is associative. In addition to decreasing the total time needed to produce an ultimate result, the parallelism also offers some possibility of recovering from partial failure of servers or storage during the operation. If one mapping node or reducing node fails, the work can be rescheduled if the input data is still available.

Map-Reduce can be conceptualized as a 5-step parallel and distributed computation. In the first step, the map input is prepared. The Map-Reduce system designates map processors, assigns a first input key value upon which each map processor can work, and provides each map processor with all of the input data associated with that first input key value.

In the second step, mapping nodes execute user-provided map code. The mapping nodes execute the map code once for each of the first key values. The execution of the map code generates output organized by second key values.

In the third step, the output from the second step is shuffled to reducing nodes. The Map-Reduce system designates reducing processors. The Map-Reduce system assigns, to each reducing processor, a second key value upon which that processor is to work. The Map-Reduce system provides, to each reducing processor, all of the data produced during the second step that is also associated with that reducing processor's assigned second key value.

In the fourth step, the reducing nodes execute user-provided reduce code. The reducing nodes execute the reducing code once for each of the second key values produced during the second step.

In the fifth step, the final output is produced. The Map-Reduce system collects all the output data generated by the fourth step, and sorts that data by their second key values to produce the final output.

Although the steps above can be imagined as running in sequence, in practice, the steps can be interleaved as long as the final output is not affects by that interleaving.

Event Processing Scenarios that Benefit from Distribution

Inasmuch as the quantities of data that are to be analyzed have grown tremendously in modern times, scalable event processing mechanisms are very useful. Scalability in this context can involve not only an increase in the quantity of processing threads that are involved in performing event processing, but also in the quantity of computing machines that can process events in parallel. Disclosed herein are techniques for distributing an event processing application across multiple virtual machines, such as JAVA virtual machines (JVMs).

Many different event processing scenarios lend themselves well to distributed execution. These scenarios tend to possess certain characteristics. First, these scenarios are not extremely latency bound, but may involve latencies in the microseconds range, for example. Second these scenarios are capable of being logically partitioned, such as by customer or by region. Third, these scenarios are capable of being logically divided into separate individual components or tasks that can be executed in parallel, such that there is no total ordering constraint.

One example of an event processing scenario that usefully can be executed in a distributed manner is the word count scenario. In this scenario, the system maps incoming sentences into meaningful terms, and then reduces these terms to a count (per term). The work performed in the word count scenario can be performed using Map-Reduce batching, but also can be performed using stream processing. This is so because, using stream processing, a real-time flow of words, such as one coming from Twitter or another social media feed, can be counted. Using stream processing relative to social media feeds allows speedier reaction than might be possible using other processing approaches.

If stream processing is used to handle social media feeds, such as to count the words in those feeds, then the stream processing mechanism might be subjected to a very high volume of incoming words. In order to handle a high volume of information, the processing of the information can be distributed. Separate computing machines can subscribe to disparate social media streams, such as Twitter streams. These machines can process the streams in parallel, counting the words therein, and then converge the resulting counts to produce a complete result.

Another example of an event processing scenario that usefully can be executed in a distributed manner is the matrix multiplication scenario. A page ranking algorithm used by an Internet search engine can summarize the importance of a web page as a single number. Such an algorithm can be implemented as a series of cascading large matrix multiplication operations.

Because matrix multiplication can be highly parallelized, Map-Reduce can be beneficial to perform operations involving matrix multiplication. The matrix multiplication operation can be conceptualized as a natural join, followed by grouping and aggregation.

Another example of an event processing scenario that usefully can be executed in a distributed manner is the term frequency-inverted document frequency (TF-IDF) scenario. TF-IDF is an algorithm that is often employed by search engines to determine the importance of a term. Contrary to expectations, a term is less important if it is seen frequently in other documents, hence the "inverted document frequency" aspect of the algorithm.

As with the word count scenario discussed above, there is value in being able to perform TF-IDF processing in real-time using stream processing. Unlike in the word count scenario, the calculation of the TF-IDF value involves accessing historical documents for the "inverted document frequency" calculation. The involvement of historical documents makes the TF-IDF scenario a good candidate for use with Hadoop, and/or some indexing layer, like HBase. Hadoop and HBase, and their uses in event stream processing, are also discussed herein.

Another example of an event processing scenario that usefully can be executed in a distributed manner is the smart meter energy consumption scenario. It is common for households today to collect their energy consumption through the use of smart meters located in their premises. Typically, these smart meters output energy consumption sensor data in the form of events periodically throughout the day (e.g., every minute). This sensor data is captured by downstream management systems in regional processing centers. The centers use the captured data to calculate useful descriptive statistics, such as the average energy consumption of a house or neighborhood. The statistics can reveal how the average energy consumption relates to historical data for the region. These running aggregations are well suited to be partitioned. Therefore, distributed partition flows can be applied beneficially to this scenario.

Event processing can be performed relative to such information in order to identify outliers, such as households that are above or below the typical range of energy consumption. Event processing can be performed relative to such information in order to try to predict future consumption. Identified outliers and predicted future consumption can be used by energy providers for differentiated pricing, for promotions, and to control the buying and selling process of energy with their partners more effectively.

Various other scenarios, not specifically enumerated above, can be adapted for processing in a distributed manner. For example, risk analysis, involving the real-time calculation of the exposure of a financial portfolio as derivative prices change, could be performed using distributed event stream processing.

Ways of Distributing Event Streams to Create Flows

Several different techniques for distributing an event stream (e.g., a stream originating from a particular data source) across multiple event processing nodes to facilitate parallel event processing are disclosed herein. Each technique creates a different kind of flow. Some of these techniques are summarized below.

A partition flow involves the partitioning of an event stream across several separate computing resources, such as processing threads or virtual machines (e.g., JVMs) using one or more properties of the events in the stream as the partitioning criteria. Disclosed herein is a clustered version of a partition flow. Also disclosed herein is the partitioning of streamed events across the threads of an event processing network that is in a single-node configuration.

A fan-in flow involves the gathering of multiple previously distributed event flows back into a single computing resource. A fan-in flow might be used, for example, when the some state is to be co-located, such under circumstances in which a global aggregation is involved.

A load-balance flow involves the distribution of the events of a stream to a set of consuming listeners in such a way that the overall load is shared in a balanced manner across this set. Event processing nodes that are currently less loaded with work can be selected over event processing nodes that are currently more loaded with work to receive new events for processing. This prevents any one event processing node from becoming overloaded while others remain under-utilized.

A broadcast flow involves the broadcasting of all events of a stream to all consuming listeners. In this case, all listeners—such as event processing nodes—receive a copy of all events.

Clustered Domain Generation

In order to support the distributed event processing networks that correspond to the various kinds of flows discussed above, some embodiments involve the generation of clustered domains. In some embodiments, a configuration wizard or other tools guides a user through the generation of a domain that is configured for supporting distributed flows.

Resource Elasticity

In a cloud computing environment, computing resources can dynamically grow or shrink as demand increases or decreases. According to some embodiments, distributed event processing systems deployed in a cloud computing environment are pluggable into an existing infrastructure. The system can dynamically grow and shrink the quantity of computing resources currently executing the distributed flows. For example, in case of an increasingly higher load, a load-balanced flow can be automatically spawn new computing resource to further share the load.

Distributed Flows Defined as Event Processing Networks

An event processing network corresponding to a flow can be represented as an acyclic directed graph. The graph can be formally defined as a pair (N, C), where N is a set of the nodes (vertices), and C is a two-place relation over N representing the connections (arcs) from a source node to a destination node.

For example, an event processing network can be defined as event processing network1=({adapter1, channel1, processor, channel2, adapter2}, {(adapter1,channel1), (channel1, processor), (processor, channel2), (channel2, adapter2)}). An event is defined as a relation P of any pair (PN, PV), representing property names and property values.

For another example, given an event stream that represents a stock ticker, the following definition can be used: e1={(price, 10), (volume, 200), (symbol, 'ORCL')}; e2={(p1, v1), (p2, v2), (p3, v3)}. As an event processing network node may contain more than one event, a set E can be defined as an ordered sequence of events (unlike in some other cases).

For another example, the following definition can be used: {processor}={e1, e2}. The runtime state S=(N,E) of the event processing network can be presented as a two-place relation from N to E. The relation S is not injective, meaning that the same event(s) may be present in more than one node. However, the relation S is surjective, as all events of the total set of events in the event processing network are in at least one node.

For another example, the following definition can be used: state={(processor, {e1, e2}), (adapter2, {e3})}. This provides a logical model of the event flow. The model can be augmented with a physical component. This augmentation can be accomplished by assigning a computing resource R that hosts the event processing network's nodes. The new model then becomes the three-place relation S=(N,R,E), whereas R is the set of all computing resources of the cluster.

For another example, the following definition can be used: state={(processor, machine1, {e1, e2}), (adapter2, machine1, {e3})}

Distributed flows therefore can be defined as functions. These functions can take, as input, the static structure of an event processing network, the current state of the runtime, and a particular node of a particular computing resource as the subject. The function can returns a new configuration of the runtime state that considers the flow of the events from the subject to its connections. Formally, this can be defined as: distribute-flows: $n \varepsilon N$, $r \varepsilon R$, $C$, $S \rightarrow S$ Several functions are defined to support the patterns for fan-in, load-balance, partition, and broadcast flows, the latter two having two versions: one for a single virtual machine case, and another for a clustered virtual machine case. The distribution flow functions are: local-broadcast(n, r, C, S)={S−{(n,r,e)}+S' where $\forall n[(n,d)\varepsilon C \wedge (n,r,e)\varepsilon S \rightarrow (d,r,e)\varepsilon S']$}.

This reads as follows: for all sources n present both in C and S (that is, has a connection and has events), then for each destination d in C generate a new tuple state (d,r,e). Return the current state S minus the old tuple (n,r,e) plus the new tuples (d,r,e). The removal and addition in the last step represents the movement of the event from the source node to the destination nodes.

Clustered-broadcast(n, r, C, S)={S−{(n,r,e)}+S': $\forall n[(n,d)\varepsilon C \wedge (n,r,e)\varepsilon S \rightarrow \forall t[(d,t,e)\varepsilon S' \wedge t \varepsilon R]]$}. In this case, the new state S' consists of tuples for all valid permutations of destinations d and resources t. That is, all computing resources will receive events for each configured destination.

Local-partition(n, pn$\varepsilon$PN, r, C, S)={S−{(n,r,e)}+S': $\forall n[(n,d)\varepsilon C \wedge (n,r,e)\varepsilon S \rightarrow (d,r,e)\varepsilon S']$}. As threading is not being modeled in this definition, there is no difference between local partition and local broadcast. However in practice this is not the case, as threading is colored per partition.

Clustered-partition(n, pn$\varepsilon$PN, r, C, S)={S−{(n,r,e)}+S': $\forall n[(n,d)\varepsilon C \wedge (n,r,e)\varepsilon S \rightarrow \exists !t[(d,t,e)\varepsilon S' \wedge t = p\text{-sched}(e, pn)]]$}.

Load-balance(n, r, C, S)={S−{(n,r,e)}+S':$\exists !t[\forall n[(n,d)\varepsilon C \wedge (n,r,e)\varepsilon S \rightarrow (d,t,e)\varepsilon S' \wedge t = lb\text{-sched}(R)]]$}.

Fan-in(n, r, C, S)={S−{(n,r,e)}+S':$\forall n[(n,d)\varepsilon C \wedge (n,r,e)\varepsilon S \rightarrow \exists !t[(d,t,e)\varepsilon S' \wedge t = fi\text{-sched}(n, R)]]$}.

These last three are similar in structure, differing only in relation to their scheduling functions, as will be seen from the discussion below. In fact, fan-in can be seen as a special case of partition having a single key.

Scheduling Functions

According to some embodiments, scheduling functions lb-sched, p-sched, and fi-sched are defined. The implementation of these functions does not vary the structure of the distribution. The functions determine the scheduling of the resources. The default implementations of the functions are: lb-sched(R)={R→r$\varepsilon$R:r=round-robin(R)}. Lb-sched makes use of a conventional round-robin algorithm. In this case, some clustered state can be maintained.

According to some embodiments, a min jobs scheduling is used, where min jobs selects the resource that has the minimum number of jobs scheduled to run so far.

According to some embodiments, a target server is randomly chosen. Considering the law of large numbers, this embodiment is similar to round-robin except that no centralized state is needed: p-sched(e, pn)={e$\varepsilon$E, pn$\varepsilon$PN→r$\varepsilon$R: r=hash(prop(e, pn)) mod|R|}; and fi-sched(n, R)={n$\varepsilon$N, R→r$\varepsilon$R:r=user-configured-server(n, R)}.

In some embodiments, convergence to a single server that has the resources needed to process this set of events is performed. For example, if the events are to be output to an event data network/JAVA messaging service, then such server can maintain information about the event data network/JAVA messaging service server and destination configuration.

In some embodiments, the specification of a fan-in target is, by default, selected to be the cluster member with the lowest member ID, which would indicate the first server of the member to be configured.

Example Event Processing Networks

Figure 2:
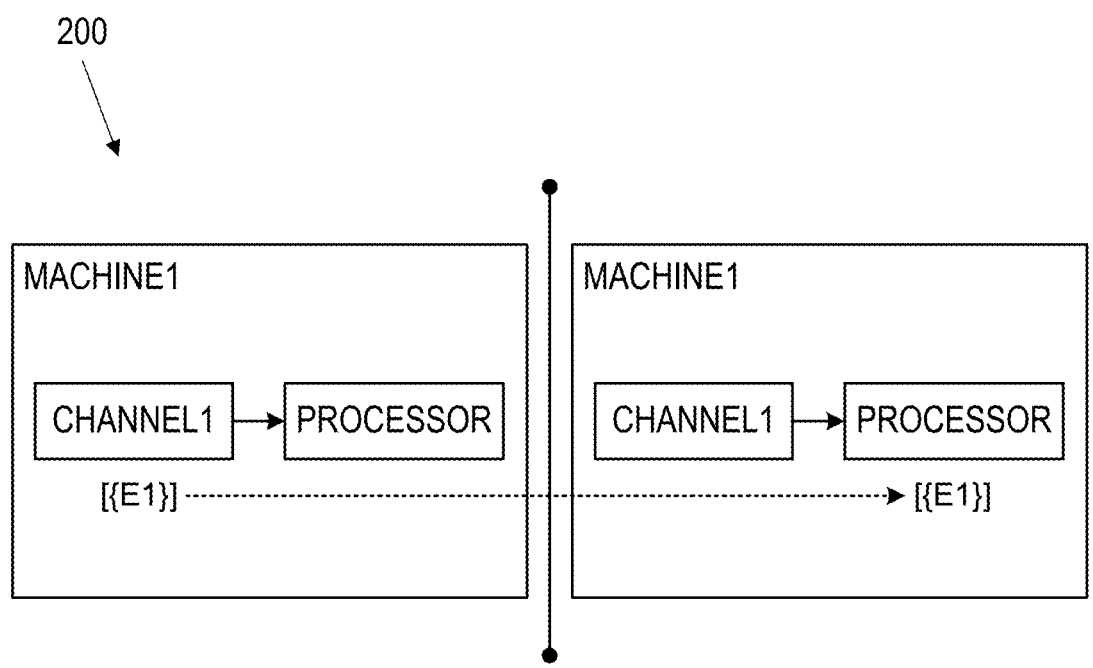
FIG. 2 is a block diagram that illustrates an example of a simple event processing network, according to some embodiments.

FIG. 2 is a block diagram that illustrates an example of a simple event processing network 200, according to some embodiments. In FIG. 2, event processing network 200 can be defined using the syntax: local-broadcast(channel1, machine1, event processing network1, {(channel1, machine1, {e1})})={(processor, machine1, {e1})}.

Figure 3:
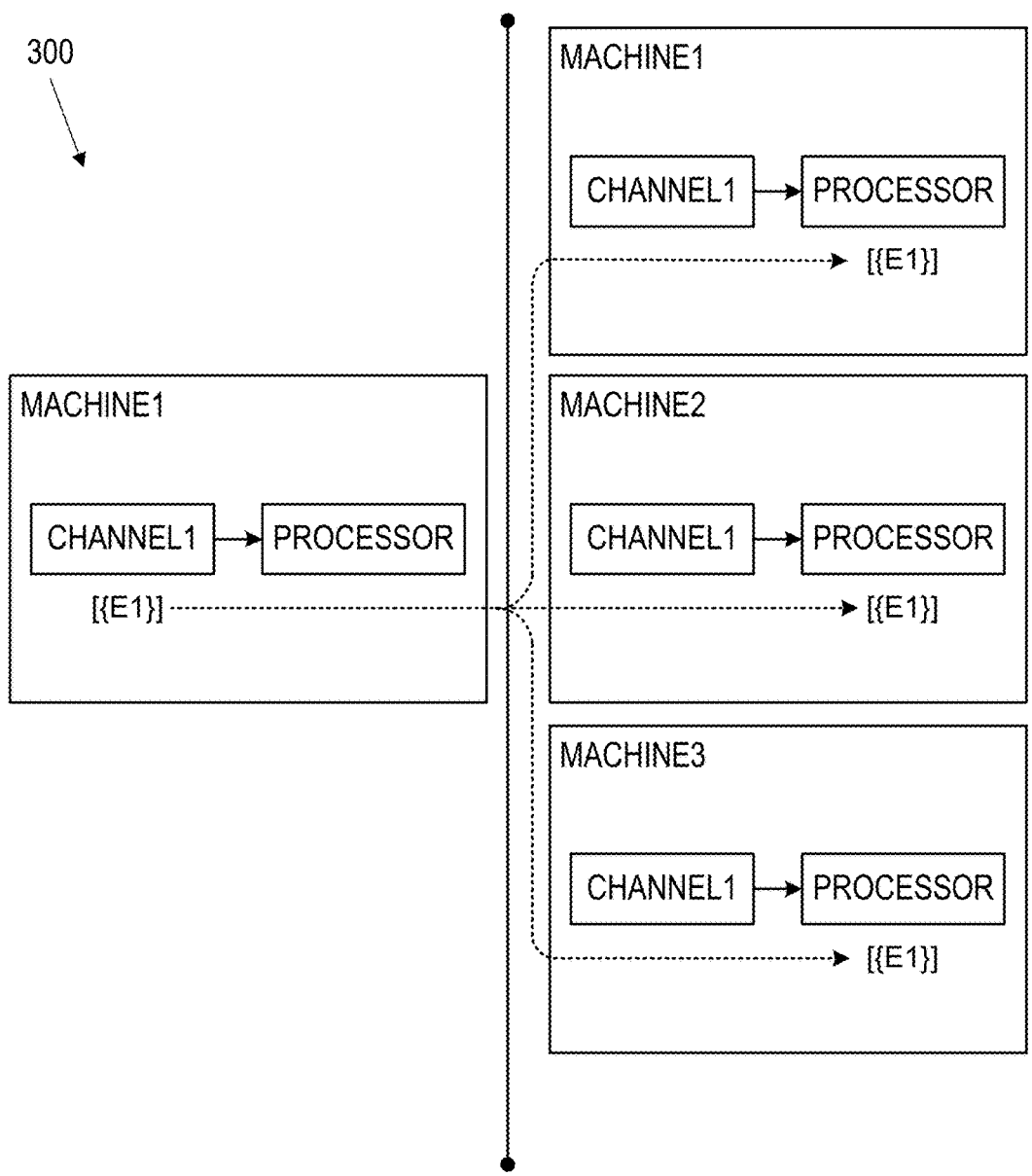
FIG. 3 is a block diagram that illustrates an example of a broadcast event processing network, according to some embodiments.

Discussed below are some clustered cases, where R={machine1, machine2, machine3}. FIG. 3 is a block diagram that illustrates an example of a broadcast event processing network 300, according to some embodiments. In FIG. 3, event processing network 300 can be defined using the syntax: clustered-broadcast(channel1, machine1, event processing network1, {(channel1, machine1, {e1})})={(processor, machine1, {e1}), (processor, machine2, {e1}), (processor, machine3, {e1})}. In this case, the same event e1 is distributed to all of the computing resources machine1, machine2, and machine3.

Figure 4:
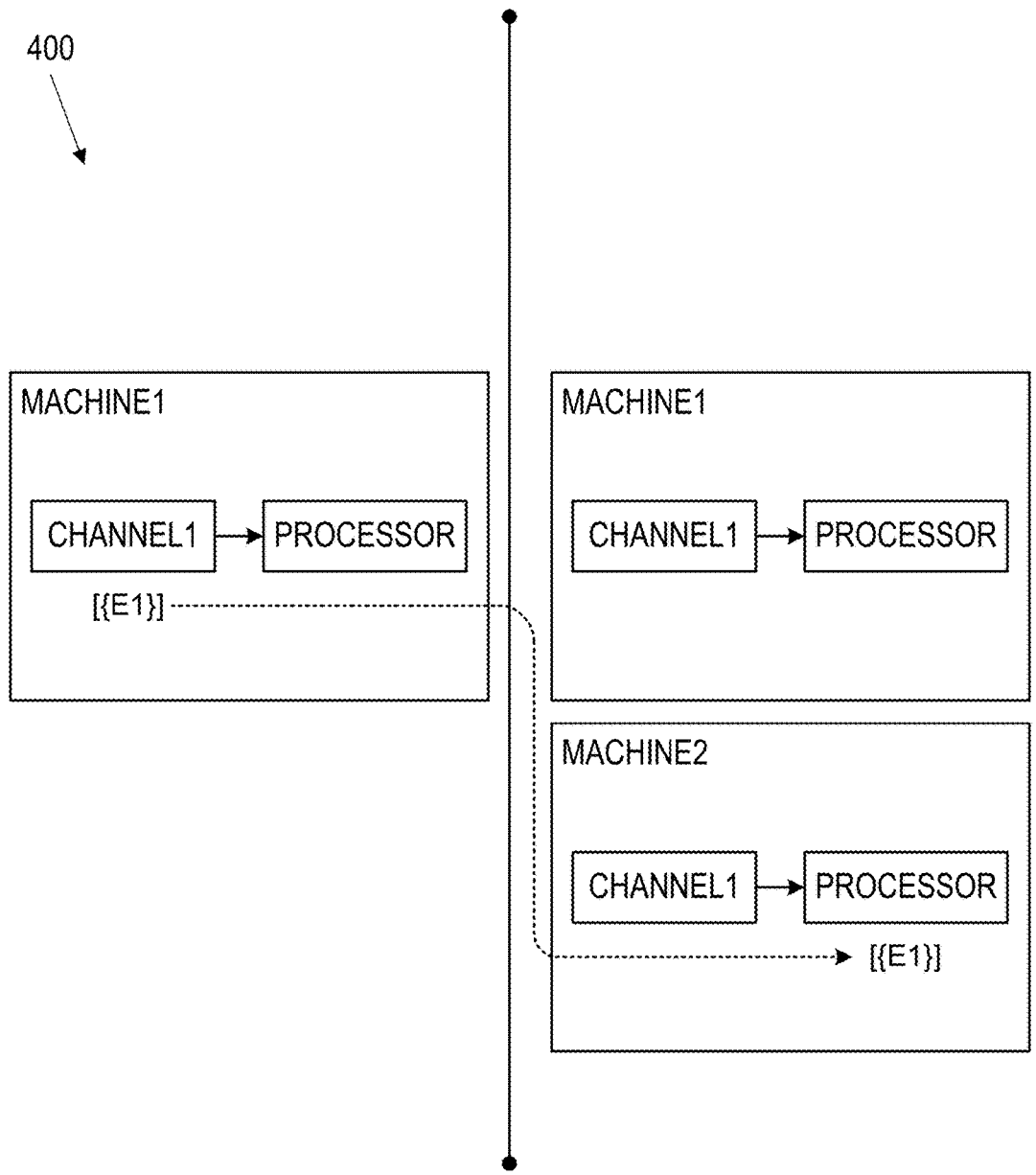
FIG. 4 is a block diagram that illustrates an example of a load-balancing event processing network, according to some embodiments.

FIG. 4 is a block diagram that illustrates an example of a load-balancing event processing network 400, according to some embodiments. In FIG. 4, event processing network 400 can be defined using the syntax: load-balance(channel1, machine1, event processing network1, {(channel1, machine1, {e1})})={(processor, machine2, {e1})}. In the case of load balancing, the state of machine2 is changed when executing the job with {e1}.

Figure 5:
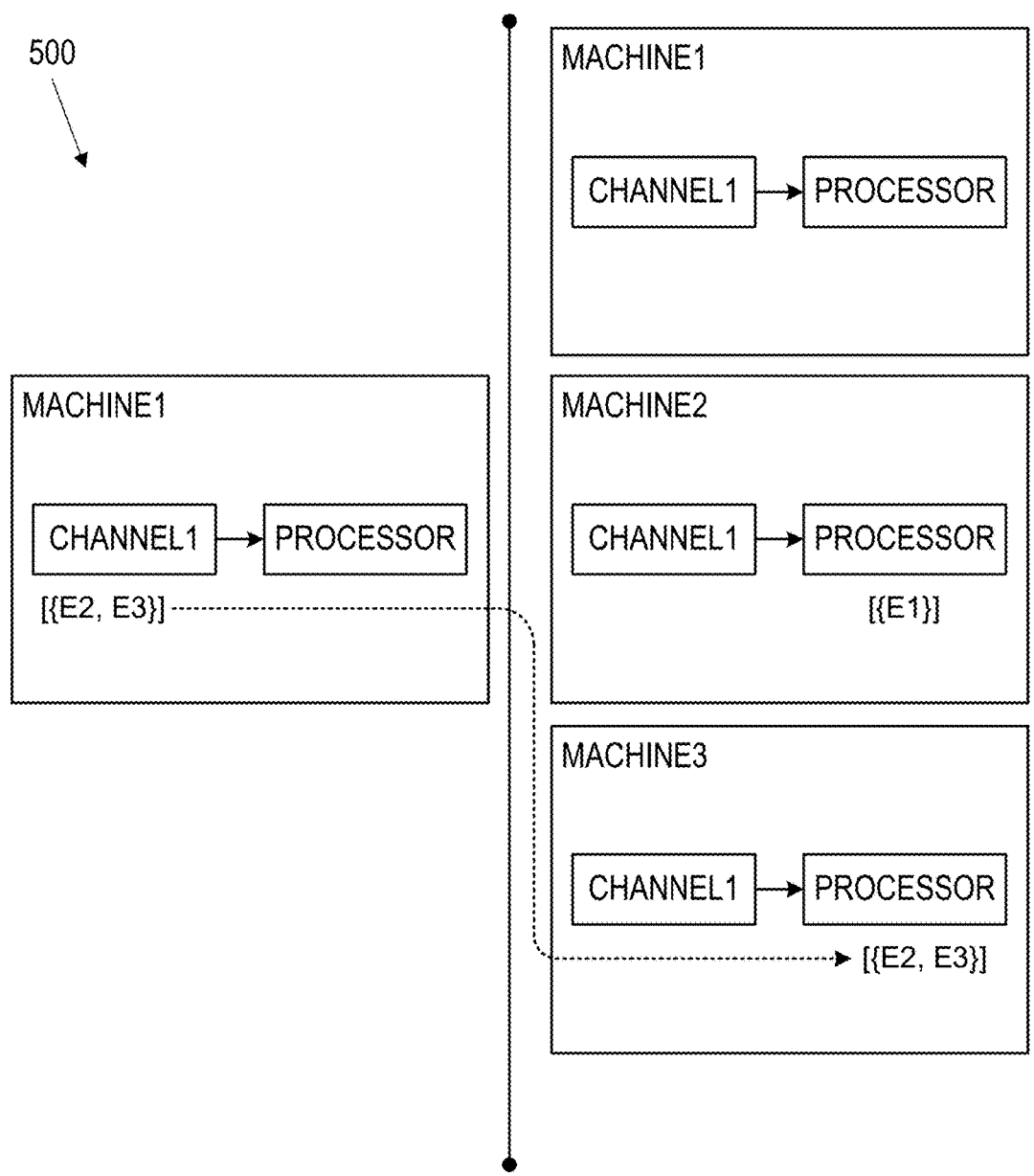
FIG. 5 is a block diagram that illustrates an example of a subsequent state of a load-balancing event processing network, according to some embodiments.

FIG. 5 is a block diagram that illustrates an example of a subsequent state of a load-balancing event processing network 500, according to some embodiments. FIG. 5 shows the state of the load-balancing event processing network of FIG. 4 following the sending of e1 to machine2. In FIG. 5, event processing network 500 can be defined using the syntax: load-balance(channel1, machine1, event processing network1, {(channel1, machine1, {e2, e3})}) {(processor, machine3, {e2, e3})}. In this case, both e2 and e3 are sent to the same machine. This is because both of them are present at the same time in the source node, and therefore it makes sense to keep them together.

In some event processing networks, a single channel can have two consumers, such that event processing network2= ({adapter1, channel1, processor1, processor2, channel2, channel3, adapter2, adapter3}, {(adapter1,channel1), (channel1, processor1), (processor1, channel2), (channel2, adapter2), (channel1, processor2), (processor2, channel3), (channel3, adapter3)}). In the case of a clustered broadcast under such circumstances, all processors in all machines receive the events.

Figure 6:
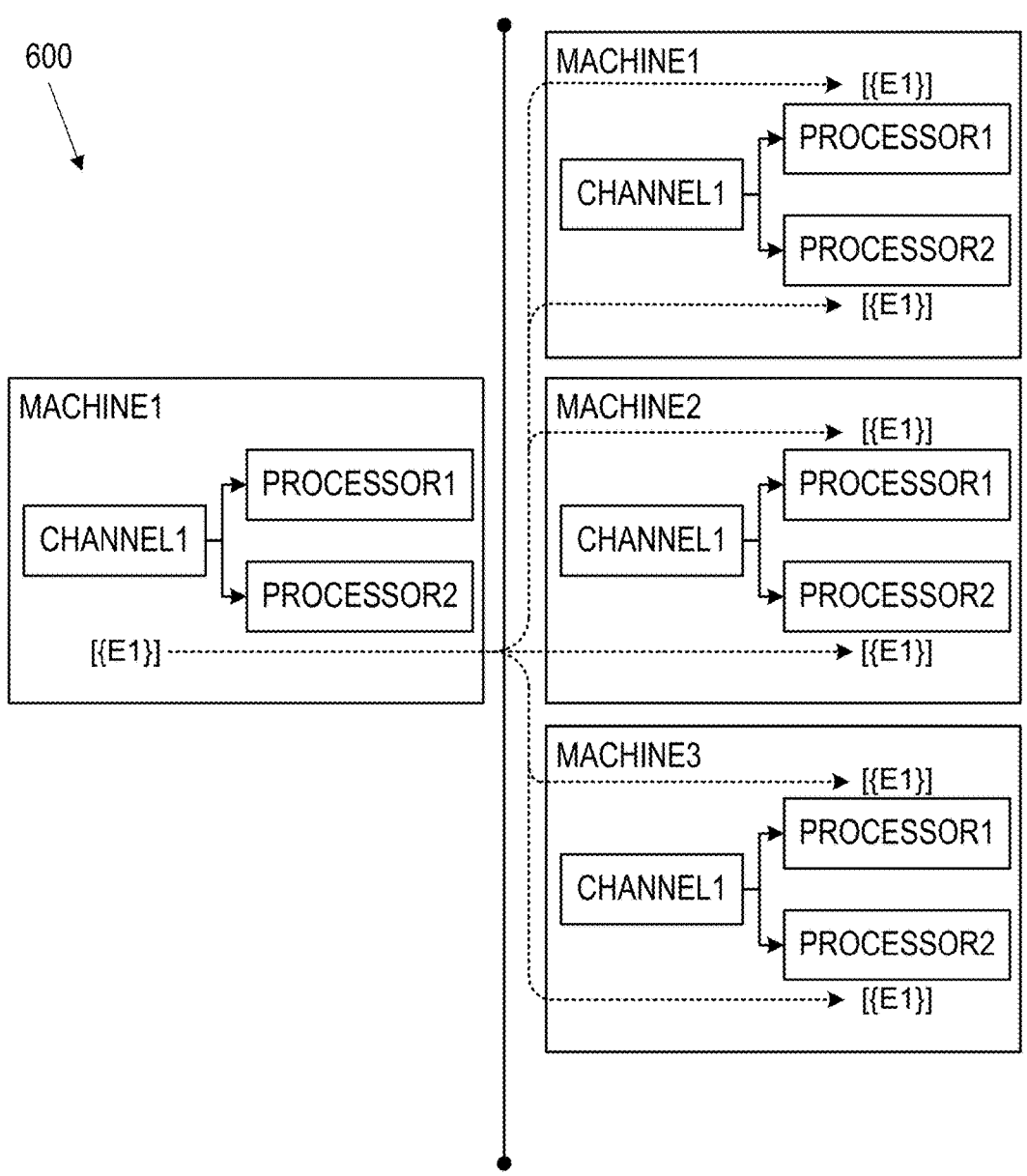
FIG. 6 is a block diagram that illustrates an example of a broadcast event processing network in which a channel has two consumers, according to some embodiments.

FIG. 6 is a block diagram that illustrates an example of a broadcast event processing network 600 in which a channel has two consumers, according to some embodiments. In FIG. 6, event processing network 600 can be defined using the syntax: clustered-broadcast(channel1, machine1, event processing network2, {(channel1, machine1, {e1})})={(processor1, machine1, {e1}), (processor2, machine1, {e1}), (processor1, machine2, {e1}), (processor2, machine1, {e1}), (processor1, machine3, {e1}), (processor2, machine3, {e1})}. Within a machine (e.g., machine1), the dispatching of the event (e.g., e1) to its consuming listeners (e.g., processor1, processor2) can happen either synchronously (i.e., same thread) or asynchronously (i.e., different thread) depending on the ordering requirements.

Figure 7:
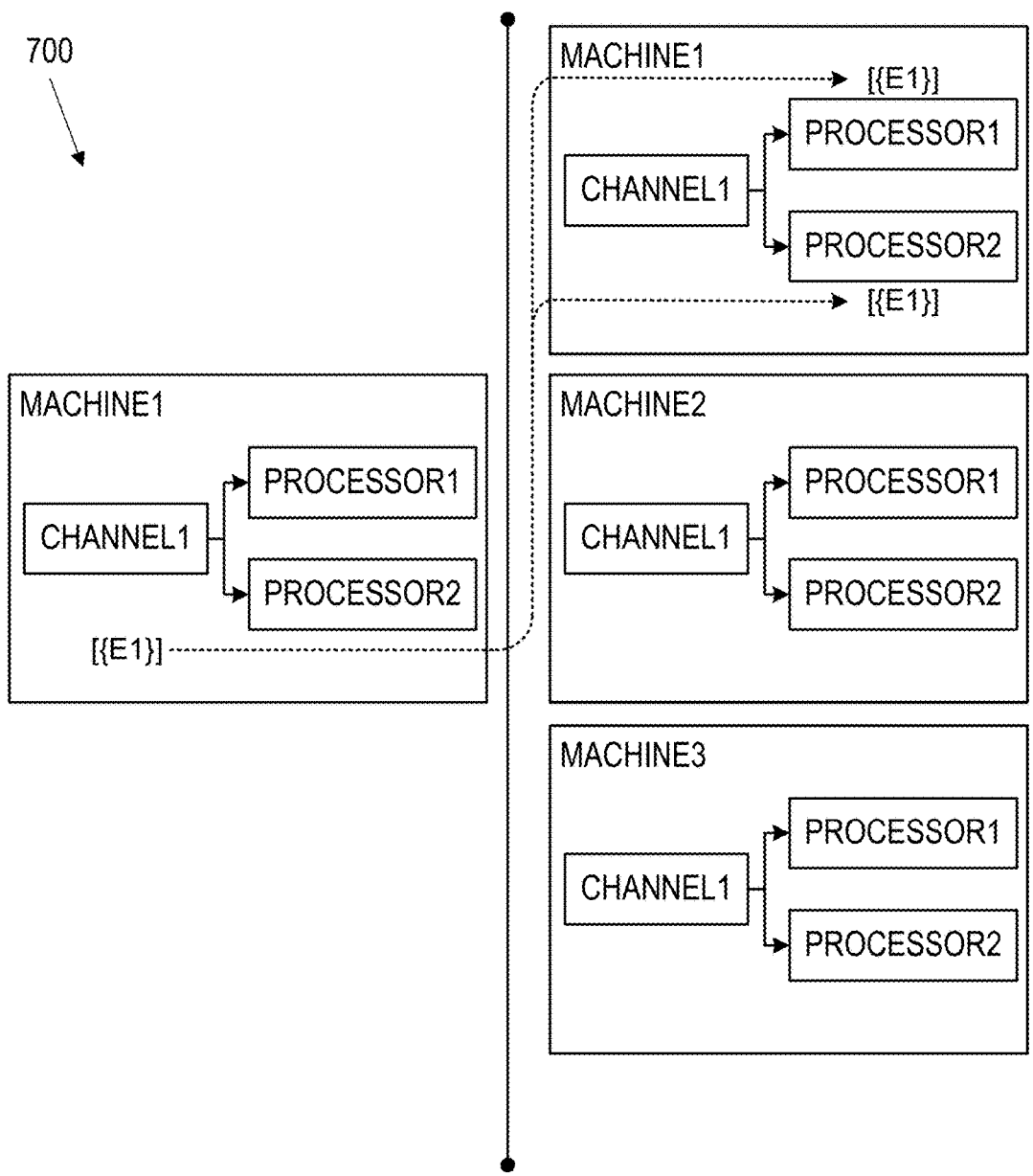
FIG. 7 is a flow diagram that illustrates an example of a technique for generating a single token usable to request services from multiple resource servers, according to an embodiment of the invention.

FIG. 7 is a block diagram that illustrates an example of a load-balancing event processing network 700 in which a channel has two consumers, according to some embodiments. In this case, there are multiple listeners. In FIG. 7, event processing network 700 can be defined using the syntax: load-balance(channel1, machine1, event processing network1, {(channel1, machine1, {e1})})={(processor1, machine1, {e1}), (processor2, machine1, {e1})}. In this case, the event is sent to all listeners of a single member. In other words, only the next event to arrive would be load balanced to a different server or machine.

Figure 8:
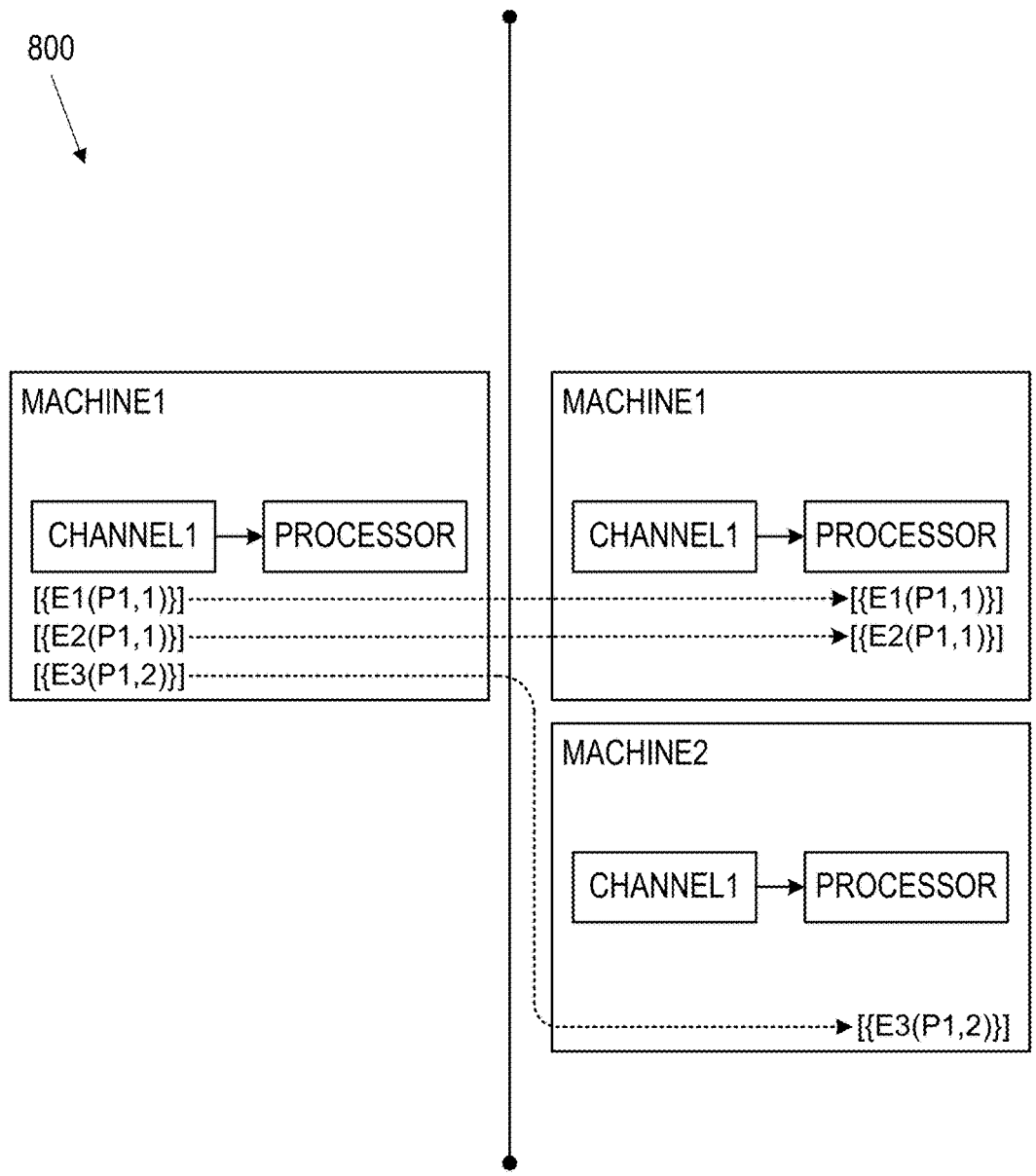
FIG. 8 is a block diagram that illustrates an example of a partitioned event processing network, according to some embodiments.

The partition and fan-in scenarios can be considered using a simple event processing network again. FIG. 8 is a block diagram that illustrates an example of a partitioned event processing network 800, according to some embodiments. In FIG. 8, event processing network 800 can be defined using the syntax: partition(channel1, machine1, event processing network1, {(channel1, machine1, {e1(p1,1)})}):-{(processor, machine1, {e1(p1,1)})}. Next, event e2 can be considered on the same partition as event e1, but with event e3 on a different partition. This can be defined using the syntax: partition(channel1, machine1, event processing network1, {(channel1, machine1, {e2(p1,1)})}) {(processor, machine1, {e2(p1,1)})}; partition(channel1, machine1, event processing network1, {(channel1, machine1, {e3(p1,2)})}) {(processor, machine2, {e3(p1,2)})}.

Figure 9:
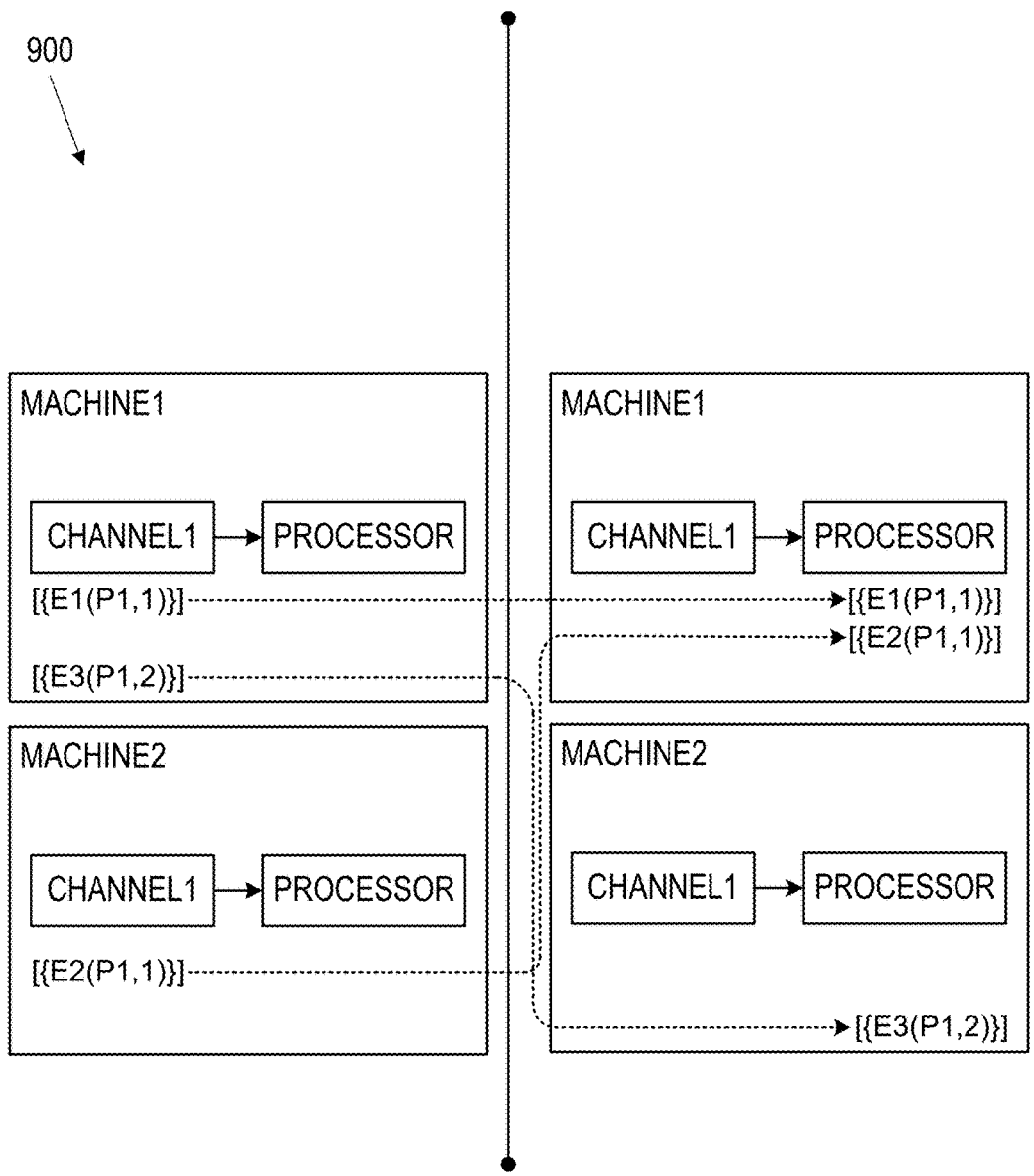
FIG. 9 is a block diagram that illustrates another example of a partitioned event processing network, according to some embodiments.

According to some embodiments, in a partitioned event processing network, events arrive in all machines rather than in just some machines. FIG. 9 is a block diagram that illustrates an example of a partitioned event processing network 900, according to some embodiments. In some embodiments, a processor may have multiple upstream channels feeding into it. This situation is similar to dealing with multiple events.

Figure 10:
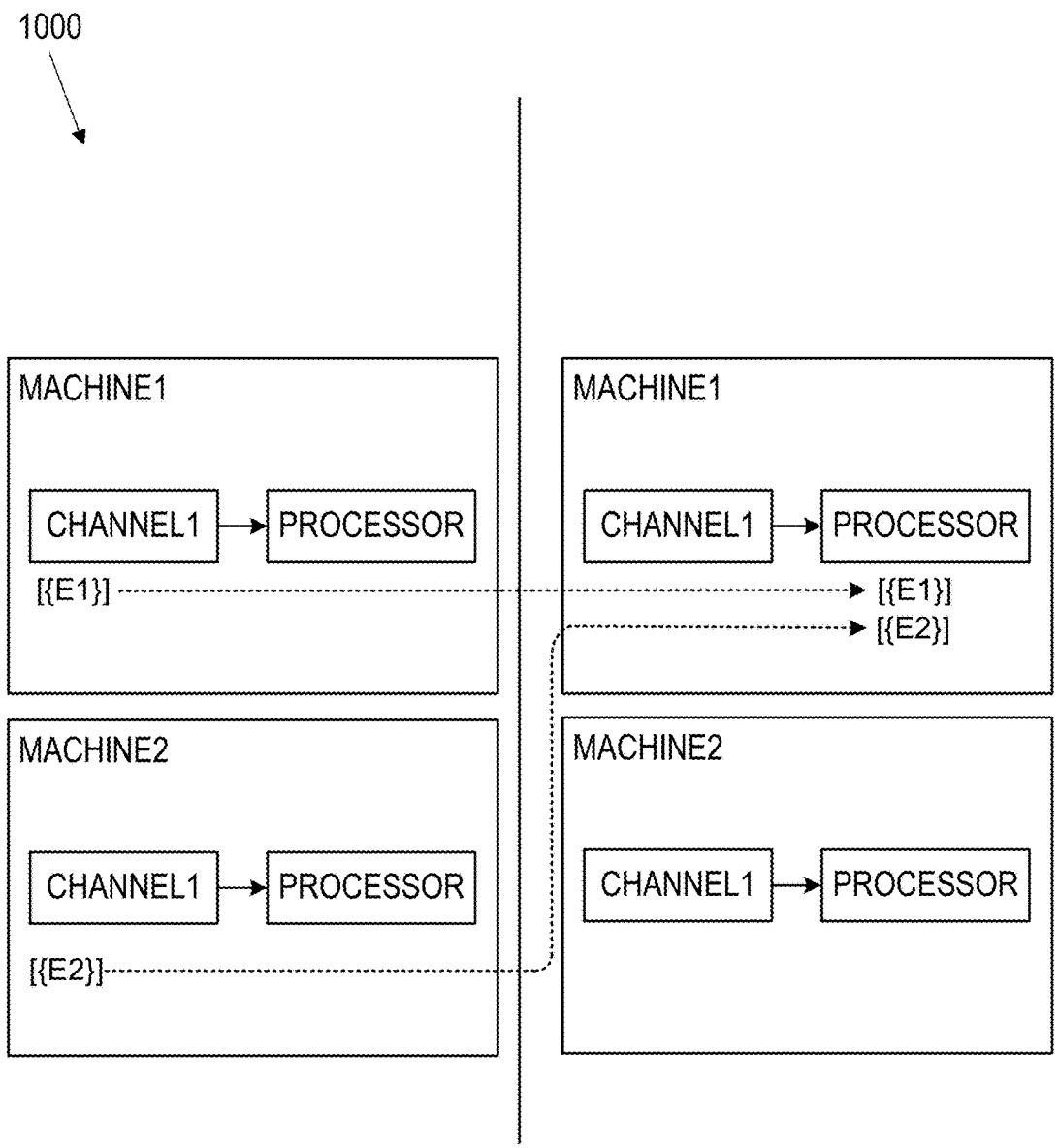
FIG. 10 is a block diagram that illustrates an example of a fan-in event processing network, according to some embodiments.

FIG. 10 is a block diagram that illustrates an example of a fan-in event processing network 1000, according to some embodiments. In FIG. 10, event processing network 1000 can be defined using the syntax: fan-in(channel1, machine1, event processing network1, {(channel1, machine1, {e1})}):- {(processor, machine1, {e1})}; fan-in(channel1, machine2, event processing network1, {(channel1, machine2, {e2})}):- {(processor, machine1,{e2})}. In the case of fan-in, the events are gathered back together in machine1.

Ordering and Query Processing Semantics

In some embodiments, events do not appear instantaneously from a node into all other destination nodes; in such embodiments, total order is not maintained all time. An ordering requirement can be safely relaxed in certain scenarios without breaking the semantics of the distribution model and of the query processing model.

There are two dimensions to be considered, that of ordering among the machine destinations for a single event, and that of ordering of the events themselves when emitted to the destinations. Each can be considered separately.

With destination ordering, in load-balancing, partition, and fan-in networks, as there is a single destination (i.e. ∃!t), destination ordering is not applicable. In clustered-broadcast networks, due to the nature of broadcast in general, no ordering guarantees need to be assumed.

With event ordering, in load-balancing networks, as there is no guarantee that the events will be sent to the same resource to begin with, there is no advantage of guaranteeing the ordering of the events, hence downstream query processing does not, in some embodiments, attempt to use application-time ordering. Further, in some embodiments, downstream query processing does not rely on receiving all events, and therefore is stateless. The type of queries that fall into this criteria are filtering and stream join (1-n stream-relation joins).

In clustered-broadcast networks, all servers have the complete set of events and therefore the full state of the processing, so in such networks, order is kept in the context of each server (i.e. destination).

In partition networks, ordering is guaranteed within a partition—to a particular destination. This permits downstream query processing to likewise make use of a partition ordering constraint. In some embodiments, this ordering is guaranteed even in the presence of multiple upstream nodes that are feeding the events to be partitioned, as in one of the cases described above in connection with FIG. 9.

In fan-in networks, a determination is made as to how the events were forked to begin with, as follows: If the events were load-balanced, then there is no ordering guarantee, and the fan-in function also does not impose any order. Following is an example of what occurs, in one embodiment, if the events are partitioned:

input: {{t4, b}, {t3, a}, {t2, b}, {t1, a}}
partition a: {{t3, a}, {t1, a}}
partition b: {{t4, b}, {t2, b}}
Schedule 1: {{t4, b}, {t3, a}, {t1, a}, {t2, b}}
Schedule 2: {{t4, b}, {t1, a}, {t2, b}, {t3, a}}
Schedule 3: {{t4, b}, {t3, a}, {t2, b}, {t1, a}}.

In case of upstream partitioning, the fan-in may end up permuting the events in a different order than that of the original input. To avoid this, the fan-in network orders the events in spite of them being received from different sources.

To cope with these different scenarios, different semantics are used in different scenarios. In the case of an unordered scenario, no ordering guarantees are needed between events as per their timestamps.

In the case of a partial-partition-ordered scenario, according to some embodiments, events are guaranteed to be ordered (i.e., a<=b) as per their timestamps in the context of a source and destination node pair and in the context of a partition. In other words, events coming from different upstream servers are not guaranteed to be ordered, and events destined to different partitions are likewise not guaranteed to be ordered.

In the case of a total-partition-ordered scenario, events are guaranteed to be ordered (i.e., a<=b) as per their timestamps across all sources and destination node pairs and in the context of a partition. To be able to support this mode, a single view of the timestamps can be imposed across the cluster. Application timestamps can be used for this case.

In the case of a partial-ordered scenario, in some embodiments, events are guaranteed to be ordered (i.e., a<=b) as per their timestamps in the context of a source and destination node pair.

In the case of a total-ordered, in some embodiments, events are guaranteed to be ordered (i.e., a<=b) as per their timestamps across all sources and destination node pairs.

These constraints have been presented in terms of least constraining to most constraining. To support these different constraints, in some embodiments, the following additional configuration is used. An application time-stamped property is an event property to be used for total order criteria. A time-out property indicates a time to wait for upstream events before proceeding. An out-of-order policy indicates whether events should be discarded, raised as a fault, or sent to a dead-letter queue if those events do arrive out of order.

In some embodiments, each distribution flow can used with a different set of ordering constraints. In load-balanced networks, the constraint can be unordered. In a broadcast network, all events of an input stream can be propagated to all nodes of the network in the same order in which they are received on the broadcast channel. Each node can maintain the full state, and every node listening to the broadcast channel therefore has exactly the same state at for any timestamp. Thus, the listener downstream of each of these nodes can receive the output events in the total order, and the constraint can be total ordered in a local broadcast. For a clustered broadcast, the event delivery across the network might cause an unordering of the events, but by definition the delivery should be total ordered so that the network can fulfill the requirement of ordered delivery. In a partitioned network, each node can maintain a partial state and receive a subset of events. The received events of a sub-stream are in the same order as observed in the input stream. Thus, across partitions (one partition on each node), the input stream is ordered, and the constraint can be partition-ordered in a partitioned network. In a clustered partition, the event delivery across network might cause the unordering of the events, but again, by definition, the delivery should be total ordered so that so that the network can fulfill the requirement of ordered delivery. In fan-in networks, the constraint can be unordered, partial-ordered, or total-ordered.

Further, if the destination node is a CQL processor and its queries are known, the distribution ordering constraint can be inferred from those queries. For example, if all queries are configured as partition-ordered, then the distribution flow also can be at least set to partial-partition-ordered.

Deployment Plans

In some embodiments, computing resources are shared across nodes. To allow for better sharing of the resources, a node may be annotated with a set of constraining requirements, such as 'memory>1M', or 'thread>3', and conversely the computing resources can be annotated with a set of capabilities, such as 'memory=10M', or 'thread-pool=10'.

For example, requirements could be denoted as requirements: {processor1}={threads>3}. Capabilities could be denoted as capabilities: {machine)}={max-thread-pool=10, cpu=8}.

During scheduling of the resources to the nodes, the system attempts to match the requirements with the capabilities, and by doing so, dynamically decreases and increases the current value of the capabilities as the capabilities are being assigned to the nodes. For example, a schedule could be denoted as Schedule-1: {processor)}= {threads>3, computing-resource=machine1}; Schedule-1: {machine1}={max-thread-pool=10, current-thread-pool=7}.

In addition, the total capability of the cluster itself may change, for example, by adding new computing resources to the cluster to cope with increases in the load of the application. This is known as computing elasticity. For example, at t=0: {cluster}={machine), machine2}, but at t=1: {cluster}={machine1, machine2, machine3}. The system copes with these dynamic changes of resources.

There may be cases when the operator of the system wants to do a manual assignment of the nodes to a specific computing resource. This can supported by considering the 'computing-resource' as a requirement itself. For example, Requirements: {processor1}={threads>3, computing-resource=machine1}. This specification of deployment requirements is known as deployment plan, and can be included within application metadata.

Cluster Member Configuration and Domain Configuration

In Hadoop, the mapping functions at the beginning of the Map-Reduce system are replicated to distributed tasks and executed in parallel, each reading a separate input data, or most commonly each reading a chunk of the input data. Stream processing is similar. The upstream nodes (i.e., inbound adapters) each subscribe to different streams or to different partitions of the stream. This means that the distributed event processing network, in some embodiments, allows for the inbound adapters to work in parallel. There is no need to keep the inbound adapters present in the secondary nodes in a suspended state.

In some embodiments, each inbound adapter can subscribe to a different stream or different partition of the stream. This can be done by using Clustered Member facilities in an event processing, where a member is able to find out if it is the primary or not, and is associated to an unique ID in the cluster, and therefore can use this ID as a key to the stream or stream partition configuration.

Secondary members may also opt on not subscribing to any events, in which case the input aspect of the system is not executed in parallel.

Cost Complexity and Batching

The communication cost in distributed systems can easily surpass the cost of processing the data itself. In fact, it is a common problem in Hadoop to try to find out the best trade-off between having too many reducers and therefore increasing the communication cost and having too few reducers and therefore having too many elements associated to a key and hence not enough memory per reducer.

To facilitate the understanding of this cost and mechanisms for coping with it, the following is provided. A latency metric is calculated as the ratio of the total latency of an event by its communication latency. This is done for some sampled rate of events, and can be turned on and off dynamically at runtime. In some embodiments, there is a guarantee that events sent together using the Batching API are indeed batched together through the whole distribution.

Behavioral Viewpoint

In some embodiments, cache coherence can be used for both messaging as well as partitioning. The semantics of the collaboration varies per flow, and can be implemented with a combination of a particular cache scheme, cache key, and filtering. A sender (source) inserts (i.e., put( ) an event into the cache, and the receiver (target) removes the event from the cache (i.e., get/delete). A MapListener API with Filtered Events can be used to guarantee that the right receiver gets the right set of events. However, if an event were to be received and then deleted as separate actions, it would cause two separate network operations. Therefore, in some embodiments, an event is allowed to expire by its own merit. This way, cache coherence batches the deletion of the events and does it at an appropriate time.

In some embodiments, the same cache service is shared for all applications per type of flow. For example, there can be a single cache service for all replicated flows, another one for the partition flows, etc. As locking can be done per entry, the handling of one event by one channel in one application does not impact other applications, and this avoids the proliferation of caches in a single server.

In the case of the broadcast flow, as all events are to be received by all members, a Replicated Cache Scheme can be used. The cache key is a hash of the member ID, the application name, the event processing network stage name (e.g., channel name), and the event timestamp (be it application or system based).

CacheKey=hash(memberId, applicationName, stageName, eventTimestamp)

The cache value is a wrapper of the original event(s) with the addition of the application ID, the event processing network stage ID, and a target ID, which is set to −1 to represent all members. The application ID and stage ID are hashes of the original application name and stage name, which are user-set strings. The wrapper can include the event timestamp (if not application property based) and the event kind (i.e., insert, delete, update, heartbeat).

CacheValue={applicationId, stageId, eventTimestamp, eventKind, sourceEvents}

In some embodiments, all clustered members register a MapListener with a Filter set to the application ID, and the event processing network stage ID for the broadcast channel in question. This means that all members acting in the role of a receiver can be called back on MapListener.entryInserted(MapEvent) when the member acting in the role of a sender puts the event into the broadcast cache.

If the flow is set to unordered, then the MapListener is asynchronous and can use the coherence thread for the downstream processing. If the flow is set to ordered, then a SynchronousMapListener can be registered, and the event can be immediately handed off to a singleton channel thread for downstream processing. In an embodiments, this is done because the whole map can be synchronized, hence the work for each channel is enqueued, the thread returned immediately so that other channels may receive their events. An original member node of the sender can receive the event through the MapListener.

In the case of a load balanced flow, the target computing resource can be selected by finding the total number of members in the cluster and generating a random number between [0, total]. In other words, rather than keeping some clustered state with the last used member, randomization can be used to accomplish load balancing. The key and values can be similar to the broadcast case. However the MapListener can be registered with a Filter set to application ID, stage ID, and target ID, where the target ID's value is the randomly selected member ID. In other words, in some embodiments, only the randomly selected target shall receive the event. According to some embodiments, load balanced flows only support the unordered case, so only an asynchronous listener is used.

In the case of a fan-in flow, the target computing resource can be specified directly by the user per some configuration mechanism. This user-defined target ID can be set in the cache value wrapper, but otherwise the semantics are similar to the load balance case. Fan-in flows support total order. In this case, in addition to using a synchronous map listener, the channel can be configured to use application timestamps, and in the receiver events can be reordered until some user configurable time-out value. The time-out value is can be in the range of a few seconds, for example, and can be based on the trade-off balance between lower latency and a higher chance of out of order events.

In some embodiments, an optimization uses a hash that guarantees that the cache keys are kept ordered. The receiver then can use a filter that retrieves all the entries for a particular channel ranging from latest to sometime in the past. In this case, a Continuous Query Map can be used. The map can be checked periodically using the same time-out configuration.

In the case of a fan-in flow, the inherent partitioning support of the Partitioned Cache Scheme can be leveraged. Cache data affinity can be set up to associate to the (partition) key composed of the application ID, the stage ID, and the configured partition event property (value)—for example, the value of 'ORCL' for the event property 'symbol'. This can be done through the use of a KeyAssociation class. The cache key can remain the same (e.g., with the timestamp). However, in some embodiments, all keys have an association to the partition key just described previously, ensuring that the partitions are kept co-located.

If cache coherence is used to lay the data in the best location, a target member is not chosen, and therefore instead of using a MapListener, an EntryProcessor is used with a filter set to application ID, stage ID, and partition event property value. In this case, the source node invokes the EntryProcessor, and the EntryProcessor implementation is guaranteed to be executed in the member where the data resides, therefore avoiding a copy of the data to a target member is one had been explicitly chosen. Cache coherence can optimize using its determinations, making full usage of its internals to determine the right number of partitions per cluster members and data size.

Invocable tasks implicitly acquire a lock for the entries it is handling. This and the fact that the data is co-located means that the entry can be deleted at the end of processing without causing another network operation (instead of letting the entry expire). If the flow is configured to be unordered, then the task can be handed off to the channel's multi-threaded executor as soon as possible. If the flow is ordered, then again the task can be handed off to the channel, but to a singleton channel thread. If the flow is partition-ordered, then the hand-off can occur per partition. The partition can be determined from the key association, and then used to index the right thread for execution. In other words, the threads can be colored per partition.

Regarding fault tolerance, if a member is down when a sender publishes an event, and if the receiver is using a MapListener, then the event is not received when the member goes back up. One approach to solve this is to use the combination of a MapListener with a Continuous Query Map. In this case, the event can be deleted as soon as it is fully processed rather than lazily. If a member receives event and goes down before finishing the processing of the event, then the event is reprocessed, which means that the event is not deleted from the cache until it is fully processed.

If partitioned data migrates to a different server, then Live Events can be listened to for a notification if a partition is migrated. In some embodiments, this situation is raised as a fault, to let the user know that the state is lost until a new window lapses. For example, in the middle of a 10 minute window, then only in the next window would the state be valid.

Structural Viewpoint

In some embodiments, all events that go through a distribution flow are serializable. In terms of configuration, the following can be added to a Channel component. Flow type: local or clustered partition, local or clustered broadcast, load-balance, fan-in; Ordering: unordered, partial-partition-ordered, total-partition-ordered, partial-ordered, total-ordered; Partition-property: String; Application-timestamp: long; Total-order-time-out: long.

Deployment Viewpoint

The coherence cache configuration can be included as part of the server deployment/configuration. This can include configuration for the different cache schemas for each of the different distribution flows.

Design-Time Considerations

In some embodiments, within an integrated development environment (IDE), a developer can select the different flavors of channels from the palette: regular channel, broadcast channel, partition channel, or fan-in channel. The different channel flavors in the palette are a visual cue to the user. They can be implemented as configuration, so as to allow the user to change the runtime distribution flow without having to author the application in the IDE. In the case of the partition channel, the IDE can follow-up by prompting the user for a ordered set of event properties to be used as the partition criteria. This ordered set of event properties can exist as defined in the event-type of the channel. Likewise, any other channel specific configuration can be configurable accordingly.

Management, Operations, and Security

The distributed channel flavor as well as any configuration associated to it may be presented in a management console, as part of the channel and the channel configuration in an event processing network diagram view. The management/monitoring console can also provide a mechanism for visualizing the full network of computing resources of the cluster. This is a deployment view of the cluster.

Further, one aspect involves being able to understand the runtime interaction or mapping between source nodes in a computing resource to destination nodes in another computing resource. This constitutes of a connection view of the cluster. In this case, not only the runtime connection is shown, but also the number of events that have gone through the connections.

Another useful monitoring tool provides the ability of guarding for a particular event. For example, a user can ensure that event $e1=\{(p1,1), (p2,2)\}$ has gone through processor2 in machine3. In some embodiments, a mechanism for watching for events is provided.

Plotting Graphs Based on Event Data

Some embodiments allow for real-time identification of situations, such as threats and opportunities, in streaming data. Such situations can be identified through a visualized graph. Described below are various graphs and plots that can be used to visualize data. Some such graphs are not monitoring graphs, but are, rather, exploration graphs. Exploration graphs can be configurable so as to allow for try-and-see pin-pointing of the different situations.

According to some embodiments, a graphing mechanism receives time series data as input. Time series data are data that varies with time. Time series data can be represented by the following types of charts: line charts, scatter plots, and radar charts. Bar and pie charts can be used to represent categorical data.

Figure 11:
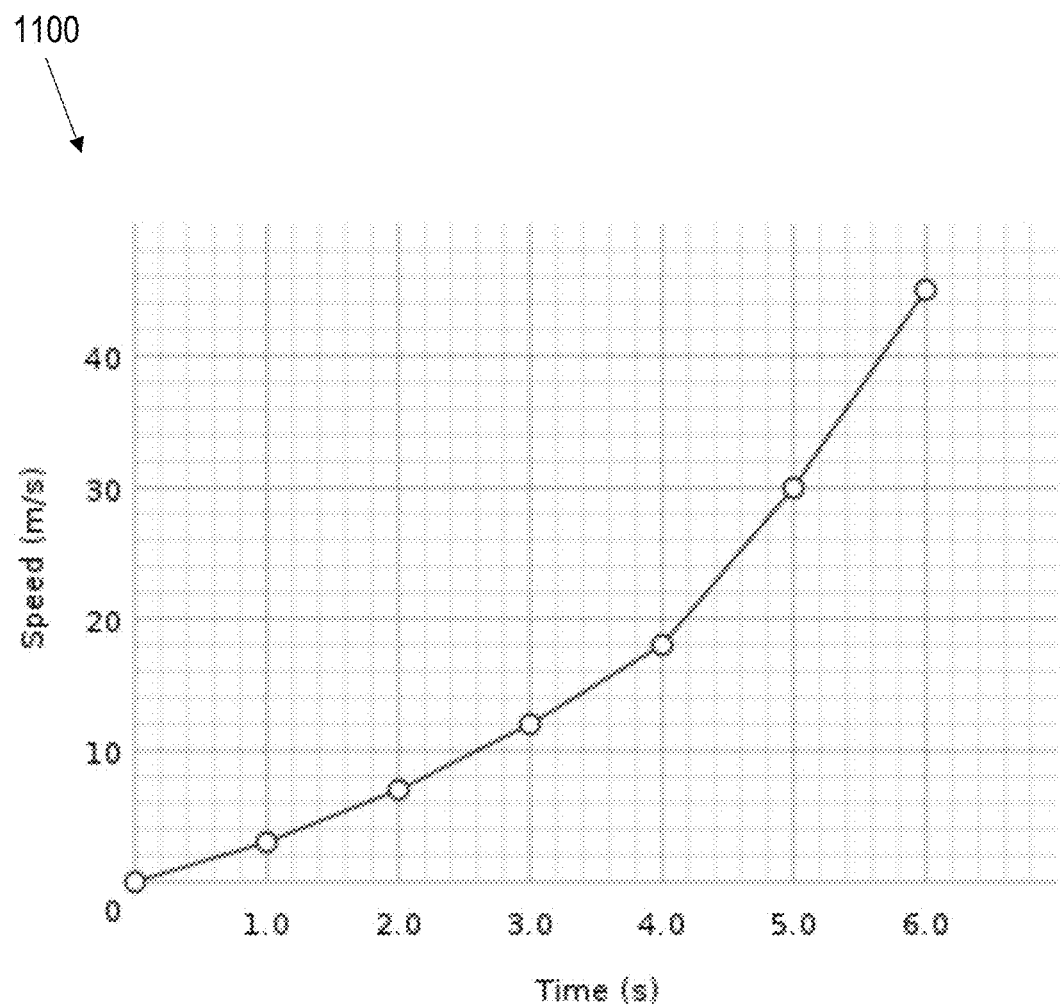
FIG. 11 is a diagram that illustrates an example of a line graph, according to some embodiments.

Line charts are the one way of visualizing time series data. The X-axis can be used to represent the time movement, and thus allow for a natural scrolling of the data as time moves forward. The Y-axis can be used to see the change of the dependent variable—the variable of interest—as time moves. FIG. 11 is diagram that illustrates an example of a line graph 1100, according to some embodiments.

The dependent variable can be any of the properties of the output event. For example, the dependent variable can be a property 'price' of a Stock event, or a property 'Sum (price)>10' resulting from an application of Summaries and Conditions to a source. Line charts are suitable for continuous variables. In some embodiments, the selection of event properties that are numerical is allowed for line charts. In some embodiments, properties of type Interval, DateTime, Boolean, String, XML, etc, are not allowed to be selected in the Y-axis. The first numerical property of the output event can be selected initially as the Y-axis. A user is allowed to change this to any other numerical property.

As is mentioned above, the X-axis can specify the time series. This axis can use the system timestamp of the arrival of an output event, converted to HH:MM:SS:milliseconds format, and slide using known slide criteria for evaluating queries and updating a Live Stream tabular output table. This is likely to be in the range of ¹/₁₀th to one half of a second. In some embodiments, optionally, the actual timestamp, or element time, of an output event as dictated by CQL can be used. In case of application-time stamped queries, the timestamp represents the application time, which can differ significantly from the system time. For example, application time may move 1 tick for every hour of actual time.

Another aspect of analyzing streaming data is to understand the correlation among its variables. Correlation shows the covariance of pair of variables, and ranges from −1 (inverse strongly correlated), 0 (no correlation), to 1 (direct strongly correlated). For example, the weight of a car directly correlates to its miles per gallon (MPG). However, there is no correlation between a car's weight and its color. To support this correlation, some embodiments allow for a second line (in a different color) to be plotted to the line chart. This second line represents a second variable, which can be a second event property selected by a user.

Each line, made up of its set of x and y pairs, is known as a data series. Having two lines plotted allows a user to visualize whether the variables have direct or indirect linearity. In addition, correlation coefficient of the variables can be calculated and presented in the graph. The correlation coefficient can be calculated using the correlate( ) CQL function. The correlation coefficient can be presented using a color graduation, where green is directly correlated, red is indirectly correlated, and gray means no correlation.

In some embodiments, a user is provided with a mechanism to select additional variables (i.e., event properties) to be plotted as lines (series) in the line chart, up to some convenient maximum (e.g., between 5 and 10). As a user is selecting properties of the output event, he can choose calculated variables, such as the result of a count of a categorical property. However, as correlations are done in a pair-wise fashion, and can be taxing, some embodiments permit only allow two variables to be correlated at a time. If the chart has more than two variables, then the user may inform which two should be used to calculate the correlation coefficient.

In some embodiments, optionally, alongside a calculation of a correlation coefficient, a confidence of a result can be calculated. This lets a user know how likely it is that a random sample would have produced the same results.

Correlations are tied to variances and co-variances. In some embodiments, optionally, a visible feature of the graph shows whether or not a distribution represented within the graph is a normal distribution or now.

In some embodiments, the top-N correlated pair-wise variables can be determined automatically.

Figure 12:
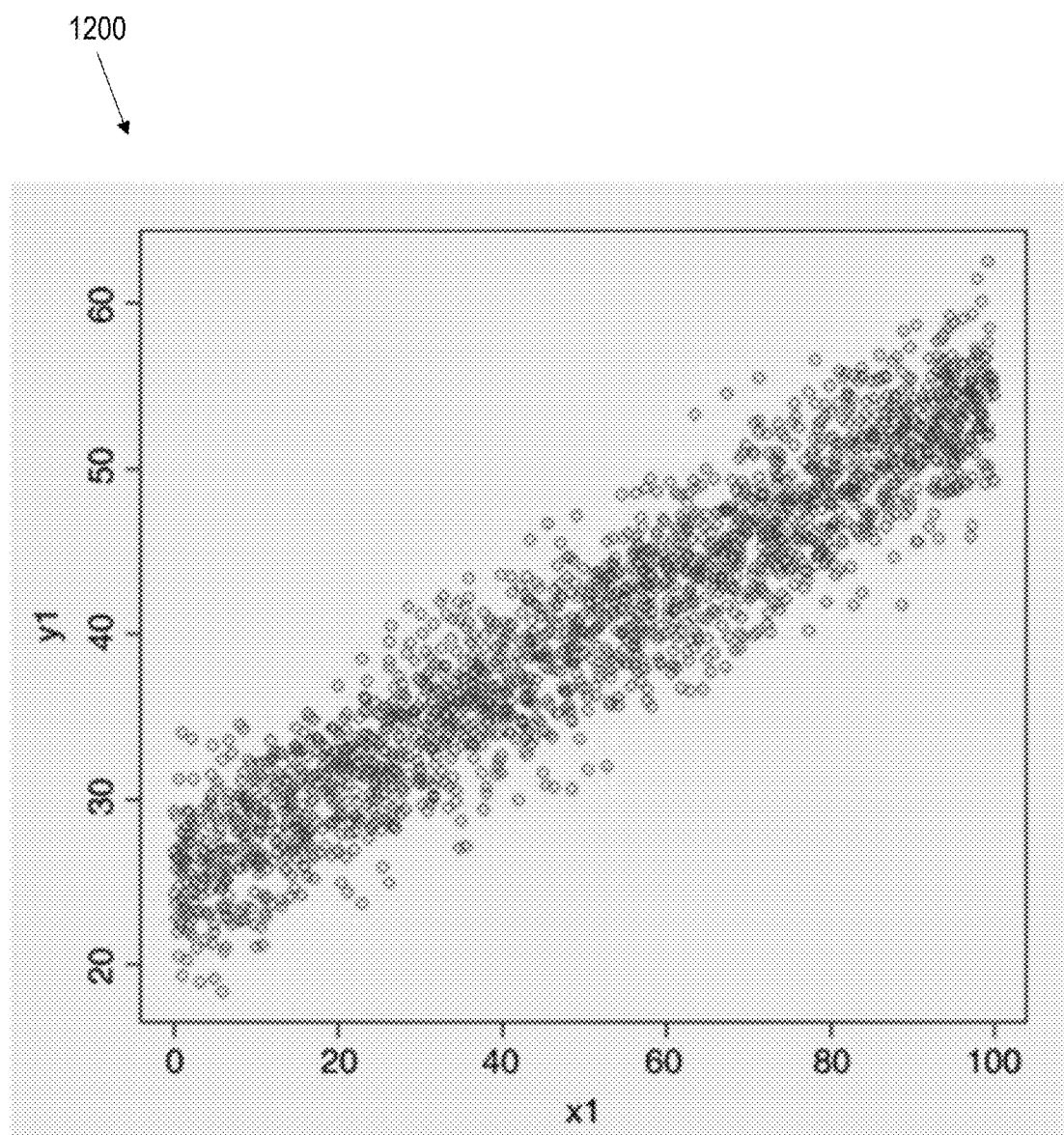
FIG. 12 is a diagram that illustrates an example of a scatter plot, according to some embodiments.

When the time dimension is less important, then data may be better understood through representation in a scatter plot. FIG. 12 is a diagram that illustrates an example of a scatter plot 1200, according to some embodiments. In this case, a user can assign distinct event properties to both the X-axis and Y-axis. However, in some embodiments, both are constrained to be numeric variables. In some embodiments, by default, the first two properties that are numeric can be selected from the output event (type). The X-axis represents the explanatory variable, and the Y-axis the response variable. Hence, properties that indicate response, or calculated field, like totalX, or sumOfY, or outcomeZ, can be good candidates for automatic assignment to the Y-axis.

In the case of time series, new values enter on the right side of the graph and old values exit on the left side. However, this behavior does not translate to scatter plots, as the new point may show up anywhere. Hence, in some embodiments, the new point is given some visual cue. For example, the new point can be drawn initially in red or blue, unlike other existing points, gradually phasing out as new points arrive.

Various numbers of points can be maintained in a graph at a time before the oldest points in the graph begin to be removed automatically. There are several ways of performing this removal. One technique keeps as many points as possible as long as those points doesn't degrade (or clutter) the visualization. Another technique keeps the least set of events needed for understanding the data.

In some embodiments, lines limiting or shaping the points in some form can be drawn in a scatterplot. One technique draws a line above all the values in the Y-axis representing the maximum, and another line below all the values in the Y-axis representing the minimum. Another technique draws a polygon encompassing all points. This gives the user a restricted view of where the values lie.

Figure 13:
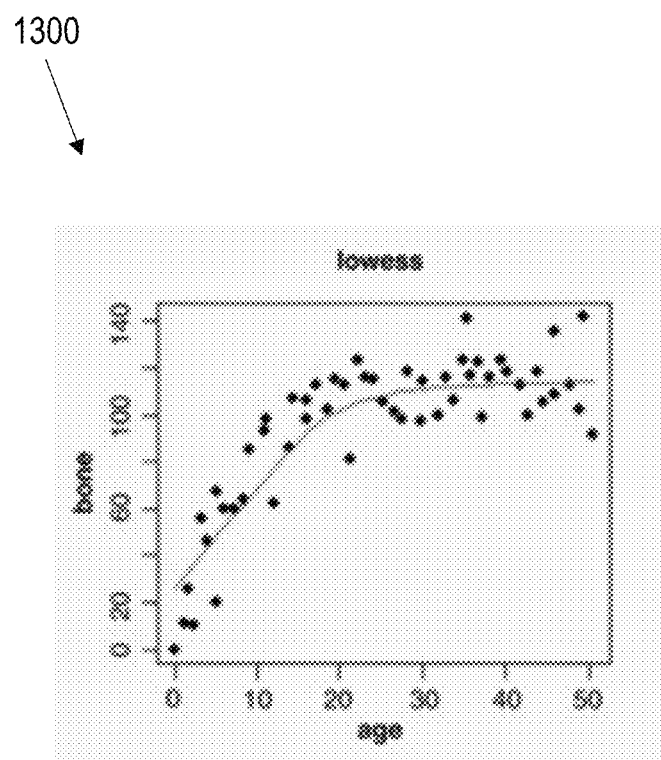
FIG. 13 is a diagram that illustrates an example of a scatterplot in which a smoothed curve fitter has been drawn, according to some embodiments.

Another technique draws a smoothed curve fitter (i.e., lowess). FIG. 13 is a diagram that illustrates an example of a scatterplot 1300 in which a smoothed curve fitter has been drawn, according to some embodiments. This technique can be leveraged for predictive online processing. As in the case of line graphs, the correlation coefficient of the two variables in question can be provided. The smoothed line and the regression fit also can indicate linearity.

Figure 14:
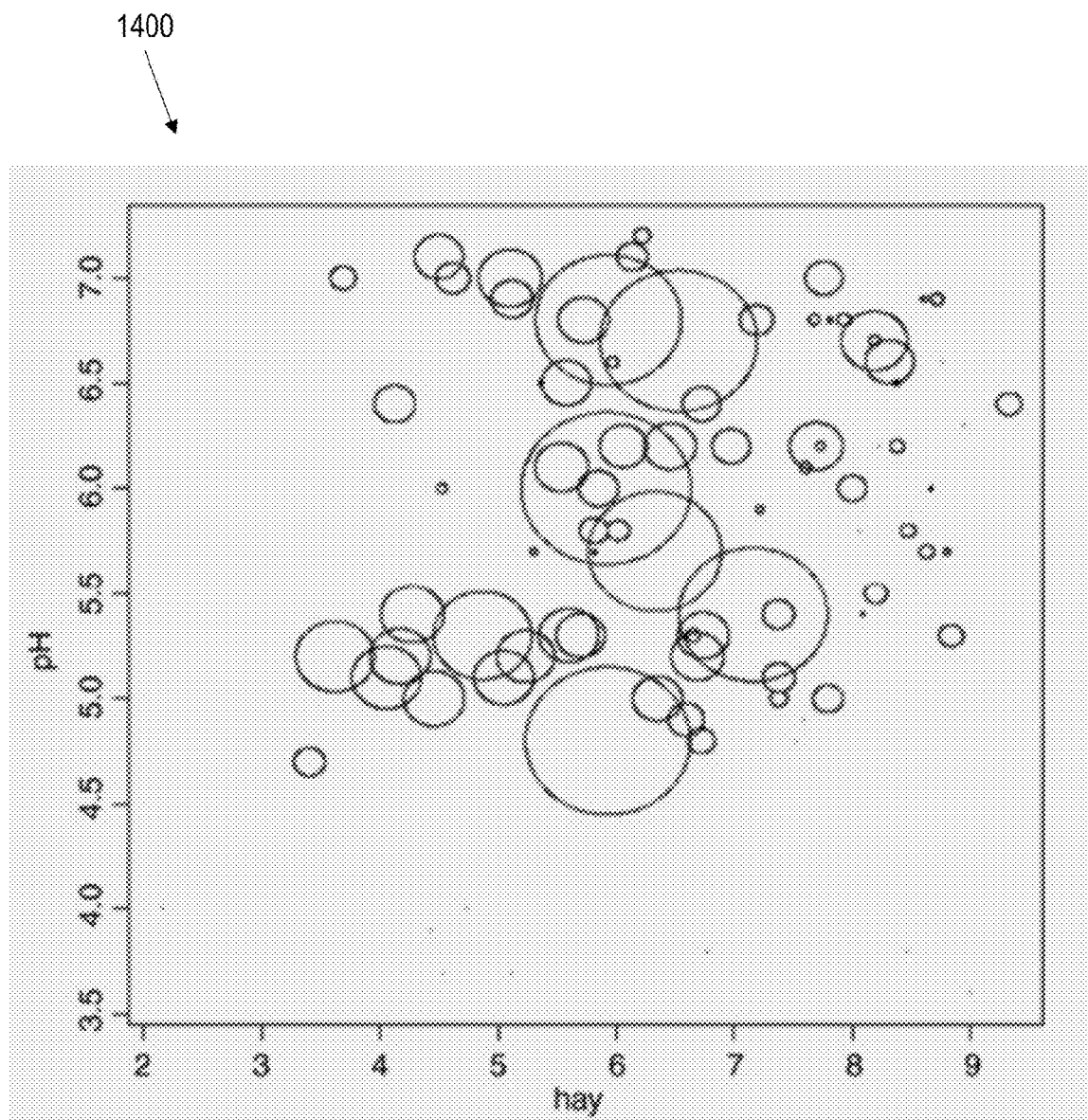
FIG. 14 is a diagram that illustrates an example of a scatterplot in which the points are differently sized, according to some embodiments.

Scatter plots lend well to supporting the visualization of a third dimension represented as the size of the points. FIG. 14 is a diagram that illustrates an example of a scatterplot 1400 in which the points are differently sized, according to some embodiments. In this case, the can user to assign a third event property to the 'size' dimension. A mechanism can scale the sizes in a manner that avoids cluttering the graph.

Figure 15:
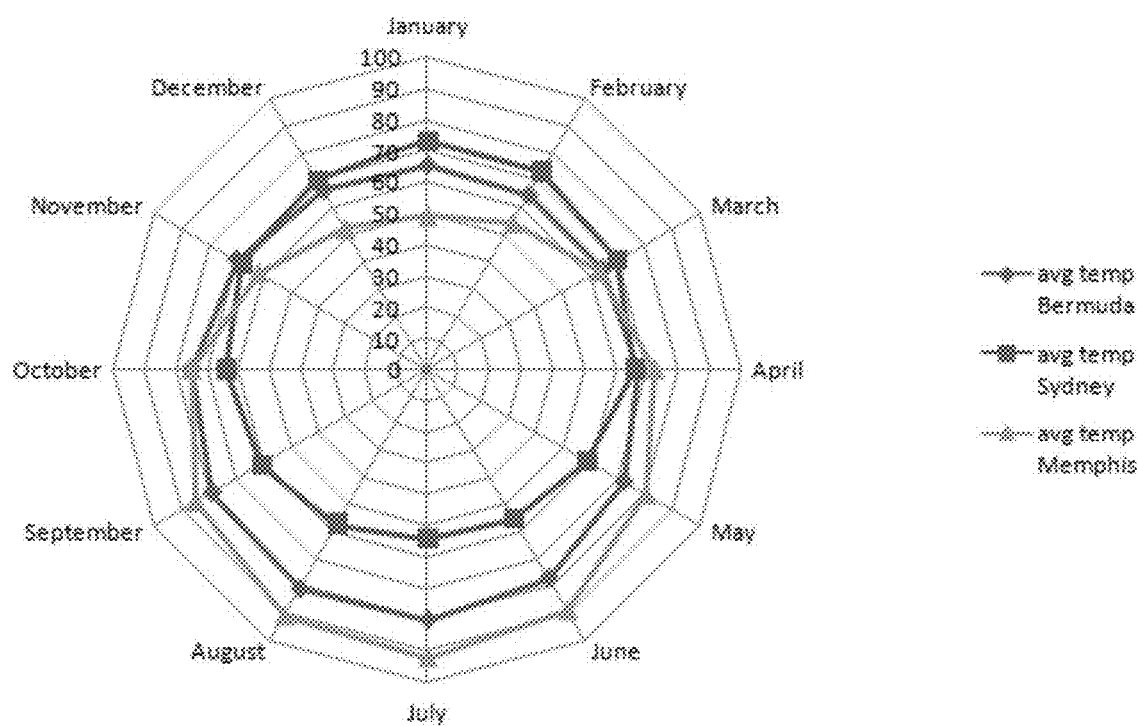
FIG. 15 is a diagram that illustrates an example of a radar plot, according to some embodiments.

Radar charts are similar to line charts except that the X-axis is drawn as in a circle representing a period of time, such as a 24 hour period, making them look like radars. FIG. 15 is a diagram that illustrates an example of a radar plot 1500, according to some embodiments. Radar charts are useful for finding whether a particular situation is cyclic, and hence a useful tool for dealing with time series. For example, such charts can be used to determine whether the price of a stock is typically high in the beginning or at the end of the business day, or whether the number of airplane tickets sold on Fridays is higher than any other day of the week.

The response variable for radar charts can also be numeric. Finding the right scale for the X-axis is a consideration for radar charts. If a window range is being defined, then it can be used as the default cycle for the radar charts. Otherwise, the cycle can be changed from milliseconds to hours. Additional lines can represent the different response variables in the chart, as with the line chart.

Numerical variables are not the only variable that can be visualized in a graph. Categorical variables, be they nominal (e.g., male, female), or ordinal (e.g., high, medium, low) also can be visualized in a graph. Categorical variables are generally analyzed as frequencies, such as, for example, the number of frauds (the factor being 'fraud', 'no fraud'), the proportion of gold customers versus regular customers, the top 5 movies seen last week, etc. Such variable are usually visualized in bar and pie charts. In some cases, like the top-n, there can be a high CPU/memory consumption involved in calculating frequencies. Because of this, in some embodiments, such calculations are not performed in the background. In some embodiments, the following operations are performed:

1. Select bar chart (or pie-chart)
2. Assign String-typed event property to X-axis
3. Assign Count result (or any other numerical property) to Y-axis The count result can be updated as per defined by user, for example, using a window range, hence there is no need to explicitly purge the values from the bar chart. A pie chart could also be selected. It can be left to the user to make sure the total amount across the categories amounts to 100%.

Line charts are suitable for scenarios involving looking for general trends in a time series and for numerical variables. Scatter plots are suitable for scenarios involving looking for correlations and for numerical variables. Radar charts are suitable for scenarios involving looking for cycles and for numerical variables. Bar charts are suitable for scenarios involving counting frequencies and for categorical variables.

As certain types of graphs can be better suited for a particular type of data (e.g., categorical or numerical) and analysis, they likewise can be sized and updated differently. The time series-focused line charts contain the last t time of events, and can move (update) with the system (CPU) movement of time. In other words, even if no events arrive, the chart will still update and move any previously plotted event from right to left. By default, the line chart can be configured to contain the last 300 seconds of events. However, the user can change the parameter t (e.g., 300) as well as the time granularity from milliseconds to minutes. If a time window is being defined, then the size of the time window can be used as the default size (scale) of the X axis for the line graph.

The radar chart is similar to the line chart, with the addition that one also configures the period intervals. For example, the configuration can indicate to show 300 seconds in cycles (periods) of 60 seconds each. The scatter plots and bar charts are not geared towards time, and hence in some embodiments are updated only as events arrive and not necessarily as time progresses. The size of the X axis can be determined using power analysis as follows: Considering that the scatter plot is being used to spot correlations, and that typically a correlation is considered strong if there is a 80% covariance between the variables, then using a confidence level of 95% (that is, there is 5% chance of random points representing a significant pattern), gives:
pwr.r.test(r=0.20, power=0.95, sig.level=0.05, alternative='greater')=265.8005

That is, the scatter plot should include at least 265 points. If this were relaxed to a 75% correlation, with 10% margin for error, then:
pwr.r.test(r=0.25, power=0.90, sig.level=0.10, alternative='greater')=103.1175

Both options are possible. In some embodiments, the user can customize the size to any arbitrary number.

The bar charts function similar to the scatter plots, and in some embodiments are only updated as new events arrive. The number of categories can be decided using a process. A default in the 10 to 20 range can be assumed. A user can customize further as needed. In some embodiments, top-n categories can be selected. In some embodiments, this can be coded into a query.

The tabular output can also be sized in similar terms to the scatter plot. One question that arises when plotting points that have multiple variables is that of scale. In particular, this is very evident when using line charts with multiple series. This can be done in two steps:
1. Center the data so that it is closer to the mean value; this brings in the outliers.
2. Normalize the proportions by dividing the data by its standard deviation.
The formula is:

$$x' = (x - \text{mean})/\text{standard-deviation}$$

Due to its streaming nature, the mean and standard deviation are in some embodiments updated continuously.

Clustering Unsupervised Learning

Clustering groups events whose variables (features) are closer together. This grouping allows a user to identify events that go together due to some unknown relationship. For example, in the stock market, it is common for a cluster of derivatives to go up or down together. If there is a positive earning report from IBM, it is likely to be followed by positive results from Oracle, Microsoft, and SAP, for example.

One appeal of clustering is that it is unsupervised; that is, the user does not need to identify a response variable, or provide training data. This framework fits well with streaming data. In some embodiments, the following algorithm is used:

If each event i contains j variables (e.g. price, volume) specified as $x_{ij}$, and if the goal is to cluster the events into k clusters so that each k cluster is defined by its centroid $c_{kj}$, which is a vector of the mean of the j variables for all the events that part of the cluster, then, for each event that is inserted into the processing window, its k cluster can be determined:
1. If it is the first event, assign it to the smallest k cluster (e.g. cluster 0).
2. For every (new) input event i, calculate its (square) distance to the centroids of the k clusters, as follows:
2a. $dist_{ik} = SUM_j((x_{ij} - c_{kj})^2)$
2b. Assign event i to the cluster k that has the smallest $dist_{ik}$
3. Recalculate the centroid for the selected cluster k:
3a. For all j, $c_{kj}' = (c_{kj} + x_{ij})/|c_k| + 1$ For streaming data, there is the additional complexity of handling events that leave the processing window:
1. For every (old) event i from cluster k that is purged, recalculate its cluster's centroid:
1a. For all j, $c_{kj}' = (c_{kj} - x_{ij})/-1$ As the centroids change, which happens for every event (new and old), there is a potential for existing events (points) to be relocated to a new cluster, where the distance has become the smallest. Hence, the process in some embodiments recalculates the distance for all assigned points until no more re-assignments happen. However, this can be a laborious step. If the processing window is small and fast-paced, the removal and addition of new points will have the same effect and slowly converge to the best local optimum that can be achieved. Because this convergence is not guaranteed, an option to enable/disable the re-calculation as events arrive can be provided.

Another issue is that of scaling; as the distance is calculated as the Euclidian distance between the features, features are equally scaled in some embodiments. Otherwise, a single feature may overwhelm the other features during the distance calculation.

The clustering algorithm can be expressed as a CQL aggregation function of the form:
cluster(max-clusters: int, scale: Boolean): int
cluster(max-clusters: int, scale: Boolean, key-property: String): List<String, Integer>

The parameter max-clusters defines the total number of clusters (i.e., k), and is not changed once the query is started. The latter signature enables the re-calculation of the cluster assignments, and returns a list of event key to cluster assignments.

Figure 19:
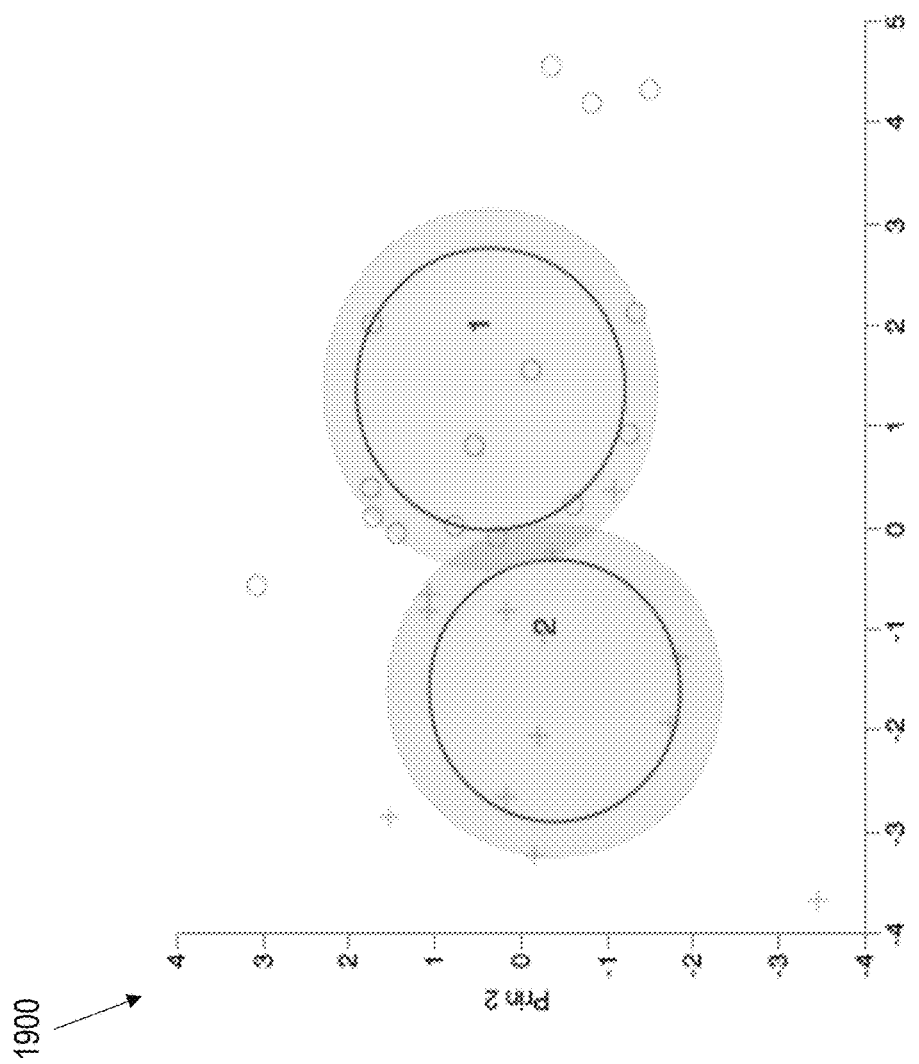
FIG. 19 is a diagram that illustrates an example of cluster-representing shapes being overlaid on a scatter plot, according to some embodiments.

In terms of visualization, the clustering data can be overlaid on top of any of the supported graphs defined previously. In other words, if the user chose a scatter plot, then as part of each point a color and/or shape can be included that associates the point to one of the k clusters. FIG. 19 is a diagram that illustrates an example of cluster-representing shapes being overlaid on a scatter plot 1900, according to some embodiments. The shapes include the points that belong to the clusters that the shapes represent.

HBase

As is discussed above, the calculation of a TF-IDF value involves accessing historical documents for an "inverted document frequency" calculation, making the TF-IDF stream processing scenario a good candidate for use with an indexing layer like HBase. HBase is suitable for 'Big Data' storage where the functionality of a relational database management system (RDBMS) is not required. HBase is a type of 'NOSQL' database. HBase does not support Structured Query Language (SQL) as a primary means to access data. Instead, HBase provides JAVA application programming interfaces (APIs) to retrieve the data.

Every row in an HBase data store has a key. All columns in the HBase data store belong to particular column families. Each column family consists of one or more qualifiers. Thus, to retrieve that data from an HBase data store, a combination of row key, column family, and column qualifier are used. In the HBase data store, every table has a row key similar to how every table in a relational database has a row key.

FIG. 1 is a diagram that illustrates an example of a table 100 in an HBase data store, according to some embodiments. Table 100 includes columns 102-110. Column 102 stores a row key. Column 104 stores a name. Column 106 stores a gender. Column 108 stores grades for a database class. Column 110 stores grades for an algorithms class. The column qualifiers for table 100 are representative of the names of columns 102-110: name, gender, database, and algorithms.

Table 100 involves two column families 112 and 114. Column family 112 includes columns 104 and 106. In this example, column family 112 is named "basic info." Column family 114 includes columns 108 and 110. In this example, column family 114 is named "class grades."

The notion of an HBase column qualifier is similar to the concept of minor keys in NoSqlDB. For example, in NoSqlDB, the major key for records could be the name of a person. The minor key could be the different pieces of information that will be stored for the person. For example, given a major key "/Bob/Smith," corresponding minor keys could include "birth date," "city," and "state." For another example, given a major key "/John/Snow," corresponding minor keys could similarly include a "birth date," "city," and "state."

Information contained in an HBase data store is not retrieved using any query language. A goal behind HBase is to store large quantities of data efficiently without performing any complex data retrieval operations. As is mentioned above, in HBase, data is retrieved using JAVA APIs. The code snippets below give an idea of how data can be stored and retrieved in HBase:

HBaseConfiguration config=new HBaseConfiguration( )
batchUpdate.put("myColumnFamily:columnQualifier1", "columnQualifier1value!".getBytes( ));
Cell cell=table.get("myRow", "myColumnFamily:columnQualifier1");
String valueStr=new String(cell.getValue( ));

HBase could be used for storing metadata information for various applications. For example, a company could store customer information associated with various sales in an HBase database. In that case, the HBase database could use an HBase cartridge that enabled the writing of CQL queries using HBase as an external data source.

According to some embodiments, using a CQL processor, source events are enriched with contextual data that is contained in an HBase data store. The HBase data stores are referenced through an abstract form.

According to some embodiments, an event processing network (event processing network) component is created to represent an HBase data store. The HBase data store event processing network component resembles an event processing network <table> component, and is used as an external relation source in a CQL processor. The HBase data store event processing network component is typed using an event-type. The HBase database is started through its own mechanisms, and is accessible. The HBase database does not need to be managed directly by an event processor such as Oracle Event Processor (OEP).

According to some embodiments, the HBase data store event processing network component is provided as a data cartridge. The HBase data cartridge provides a<store> event processing network component with the following properties: id of the event processing network component, store-location (location in the form of domain:port of an HBase database server), event-type (schema for the store as seen by the CQL processor), table-name (name of the HBase table)

According to some embodiments, this event processing network component has a related <column-mappings> component in order to specify the mappings from the CQL event attributes to the HBase column family/qualifier. This component is declared in an HBase cartridge configuration file similar to the JAVA Database Connectivity (JDBC) cartridge configuration. This component has the following properties: name (the id of the <store> event processing network component for which the mappings are being declared), rowkey (the row key of the HBase table), cq1-attribute (the CQL column name used in the CQL query), hbase-family (the HBase column family), and hbase-qualifer (the HBase column qualifier). According to some embodiments, a user only specifies the 'hbase-family' in case the CQL column is a java.util.map. According to some embodiments, a user specifies both the 'hbase-family' and 'hbase-qualifier' in case the CQL column is a primitive data type.

According to some embodiments, the <hbase:store> component is linked to a CQL processor using the 'table-source' element, as in the following example:

```
<hbase:store id="User" tablename="User" event-type="UserEvent" store-
    location="localhost:5000" row-key="username">
</ hbase:store>
<wlevs:processor id="P1">
<wlevs:table-source ref="User" />
</wlevs:processor>
```

According to some embodiments, the column mappings for this <hbase:store> component are specified in the an event processor's (e.g., OEP) HBase configuration file as in the following example:

```
<hbase:column-mappings>
  <store>User</store>
  <mapping cql-attribute="address" hbase-family="address"/>
  <mapping cql-attribute="firstname" hbase-family="data"
    hbase-qualifier="firstname"/>
  <mapping cql-attribute="lastname" hbase-family="data"
    hbase-qualifier="lastname"/>
  <mapping cql-attribute="email" hbase-family="data"
    hbase-qualifier="email">
  <mapping cql-attribute="role" hbase-family="data"
    hbase-qualifier="role"/>
</hbase:column-mappings>
```

According to some embodiments, a UserEvent class has the following fields:

String userName;
    java.util.Map address;
    String first name;
    String lastname;
    String email;
    String role;

In the above example, the CQL column "address" is a map as it will hold all the column qualifiers from the 'address' column family. The CQL columns "firstname," "lastname," "email," and "role" hold primitive data types. These are the specific column qualifiers from the "data" column family. The 'userName' field from the event type is the row key and hence it does not have any mapping to an HBase column family or qualifier.

According to some embodiments, the HBase schema may be dynamic in nature and additional column families and/or column qualifiers may be added at any point in time after an HBase table is created. Hence, the event processor (e.g., OEP) allows the user to retrieve the event fields as a map which contains all dynamically added column qualifiers. In this case the user declares a java.util.Map as one of the event fields in the JAVA event type. Hence, the 'UserEvent' event type above has a java.util.Map field with name "address." If the cartridge does not support dynamically added column families, the event type can be modified if the event processing application needs to use a newly added column family.

According to some embodiments, an HBase database is executed as a cluster. In such a scenario, the hostname of the master node is provided in the configuration above.

According to some embodiments, during the configuration of the HBase source, a name of an event-type present in the event type repository is received from a user. When the "column-mappings" are being received from a user, the user interface can supply the column (field) names in that specific event-type as cq1-column. Thus, wrong input can be eliminated at the user interface level. The details of available HBase column families and column qualifiers within them can be provided for a user to select from. Parser validations are performed in the cartridge.

Customer Sales Example

The following example identifies large sales and the associated customer. Sales data is obtained in an incoming stream and customer information is obtained from the HBase database.

```
<?xml version="1.0" encoding="UTF-8"?>
<beans xmlns="http://www.springframework.org/schema//beans"
xmlns:xsi="http://www.w3.org/2001/XMLSchema-instance"
xmlns:osgi="http://www.springframework.org/schema/osgi"
xmlns:wlevs="http://www.bea.com/ns/wlevs/spring"
xmlns:hbase="http://www.oracle.com/ns/ocep/ hbase "
xmlns:hadoop="http://www.oracle.com/ns/ocep/hadoop"
xsi:schemaLocation="
http://www.springframework.org/schema/beans
http://www.springframework.org/schema/beans/spring-beans.xsd
http://www.springframework.org/schema/osgi
http://www.springframework.org/schema/osgi/spring-osgi.xsd
http://www.bea.com/ns/wlevs/spring
http://www.bea.com/ns/wlevs/spring/spring-wlevs-v11_1_1_6 xsd">
<wlevs:event-type-repository>
<wlevs:event-type type-name="UserEvent">
<wlevs:class>
com.bea.wlevs.example.UserEvent
</wlevs:class>
</wlevs:event-type>
<wlevs:event-type type-name="SalesEvent">
```

-continued

```
<wlevs:class>com.bea.wlevs.example.SalesEvent</wlevs:class>
</wlevs:event-type>
</wlevs:event-type-repository>
<!-- Assemble event processing network (event processing network) -->
<wlevs:adapter id="A1" class="com.bea.wlevs.example.SalesAdapter" >
<wlevs:listener ref="S1"/>
</wlevs:adapter>
<wlevs:channel id="S1" event-type="SalesEvent" >
<wlevs:listener ref="P1"/>
</wlevs:channel>
<hbase:store id="User" event-type="UserEvent"
store-locations="localhost:5000" table-name="User">
</hbase:store/>
<wlevs:processor id="P1">
<wlevs:table-source ref="User" />
</wlevs:processor>
<wlevs:channel id="S2" advertise="true" event-type="SalesEvent" >
<wlevs:listener ref="bean"/>
<wlevs:source ref="P1"/>
</wlevs:channel>
<!-- Create business object -->
<bean id="bean" class="com.bea.wlevs.example.OutputBean" />
</beans>
```

The following column mappings are specified in the HBase cartridge configuration file:

```
<hbase:columnmappings>
<name>User</name>
<rowkey>userName</rowkey>
<mapping cql-column="firstname" hbase-family="data"
  hbase-qualifier="firstname" />
<mapping cql-column="lastname" hbase-family="data"
  hbase-qualifier="lastname" />
<mapping cql-column="email" hbase-family="data"
  hbase-qualifier="email" />
<mapping cql-column="role" hbase-family="data"
  hbase-qualifier="role" />
<mapping cql-column="address" hbase-family="address" />
</hbase:columnmappings>
```

The "User" HBase table in the above example has the following schema:

Row Key: username
    Column Families: data, address
    Column Qualifiers for 'data' column family: firstname, lastname, email, role
    Column Qualifiers for 'address' column family: country, state, city, street
    The processor runs the following CQL query that joins an input stream with this table:
        select user.firstname, user.lastname, user.email, user.role, user.address.get("city"), price from S1[now], User as user
    where S1.username=user.username and price >10000

Here, the "address" column family was declared as a "java.util.Map" field in the "com.bea.wlevs.example.UserEvent" class. Hence, "user.address.get('<column-qualifername>')" is used in order to retrieve the value of a specific column qualifier from this column family.

HBase Fundamentals for OPENTSBD Monitoring System

Some embodiments can involve maps of maps: row-key, column family, column qualifier, and multiple versions. A row may contain multiple column families. However, each family is treated together (e.g., compressed/uncompressed). Column families may contain multiple column qualifiers. Column qualifiers can be dynamically added or removed. Each cell has multiple versions, the most recent being retrieved by default. A policy associated with a column family determines how many versions are kept and when they are purged.

Some embodiments are schema-less and type-less. APIs can include get, put, delete, scan, and increment. Querying on non-keys is performed using filtered scans, which support a rich filtering language.

Schema for OPENTSBD Monitoring System

Some embodiments can involve a UID table as follows:

| ROW COLUMN+CELL |
| --- |
| \x00\x00\x01 column=name:metrics, value=mysql.bytes_sent |
| \x00\x00\x02 column=name:metrics, value=mysql.bytes_received |
| mysql.bytes_received column=id:metrics, value=\x00\x00\x02 |
| mysql.bytes_sent column=id:metrics, value=\x00\x00\x01 |

Some embodiments can involve a metrics table as follows:

| Row (key): | | | |
| --- | --- | --- | --- |
| metric UID (3 bytes) | partial timestamp (4 bytes) | tag 1 name UID (3 bytes) | tag 1 value UID (3 bytes) ... |

| Column + cell: | |
| --- | --- |
| lower timestamp (12 bits) | Mask (4 bits) |

Queries for OPENTSBD Monitoring System

According to some embodiments, from CQL perspective, an external relation maps to the HBase table source. At the time of configuring the HBase table source, details about which attribute of the external relation maps to which column family or column family.column qualifier in the HBase table can be received from a user.

According to some embodiments, a UID can be found from a metric name. A CQL query can look like:

select metrics from S[now], UID_TABLE where UID_TABLE.rowkey=S.uid

Here, "metrics" is an attribute of an external relation named UID_TABLE which maps to a "metrics" column qualifier in a "name" column family of the HBase table named UID_TABLE. Additionally, "rowkey" is another attribute of an external relation which maps to the row key of the HBase table.

According to some embodiments, all metric names starting with cpu can be found using a query such as:

select metrics from S[now], UID_TABLE where rowkey like '^cpu'

Here, a string representing a regular expression to be matched is specified. The string might be, but does not need to be, an attribute of stream S. Such regular expression-based querying can be supported using HBase API. In HBase, rows are scanned by specifying the inclusive start and exclusive end.

According to some embodiments, a similar technique is used, such as:

SELECT name:metrics FROM UID_TABLE, S WHERE rowkey>=10 AND rowkey<

Some embodiments make use of http://hbase.apache.org/apidocs/org/apache/hadoop/hbase/filter/RegexStringComparator.html According to some embodiments, predicate support capabilities are specified for an external relation. If a given predicate falls into supported predicate capability list, then it is executed on the external relation. Otherwise, all of the data are brought into memory and then the CQL engine applies that predicate.

According to some embodiments, measures for service latency metric filtered by host can be found. In this case, the CQL is:

select measures from S[now] as p, metrics_table where rowkey=key-encoding(p.serviceLatency-UID, p.ELEMENT_TIME) and host='myhost'

In the above example, "rowkey," "host," and "measures" are columns of external relation mapping to an HBase table source and key-encoding is a user-defined function.

According to some embodiments, a host's region whose service latency are higher than 1000 (milliseconds) can be found. Column qualifiers can be added dynamically to existing rows. For example, one can add a new column qualifier "region" that contains the region where the host is deployed. If the metadata to validate the attribute "host" is unavailable, the following approach can be used. In hbase:column-mappings, a user can specify:

<mapping cq1-attribute="c1" hbase-family="cf1"/>

Here, "cf1" is a column family name and c1 is of type java.util.Map. A user can access qualifiers in "cf1" as c1.get("qualifier-name"). Therefore, the CQL query can look like:

select info.get("region") from S[now] as p, metrics table where rowkey=key-encoding(p.serviceLatencyUID) and measures > p.threshold Here, "info" is the name of the attribute of the external relation that maps to the column family to which the "region" qualifier gets added dynamically.

Measures may have multiple versions. According to some embodiments, a previous version is obtained if some application timestamp is older than most recent version. According to some embodiments, the most recent version is used. A transaction-oriented use-cases might exist, such as:

SELECT product:price FROM PRODUCT_TABLE, TRANSACTION_STREAM[now] AS S
WHERE row-key=S.productId In other words, the price may have changed, yet the price as seen when the transaction was emitted still will be honored considering its application timestamp.

Hardware Overview

Figure 16:
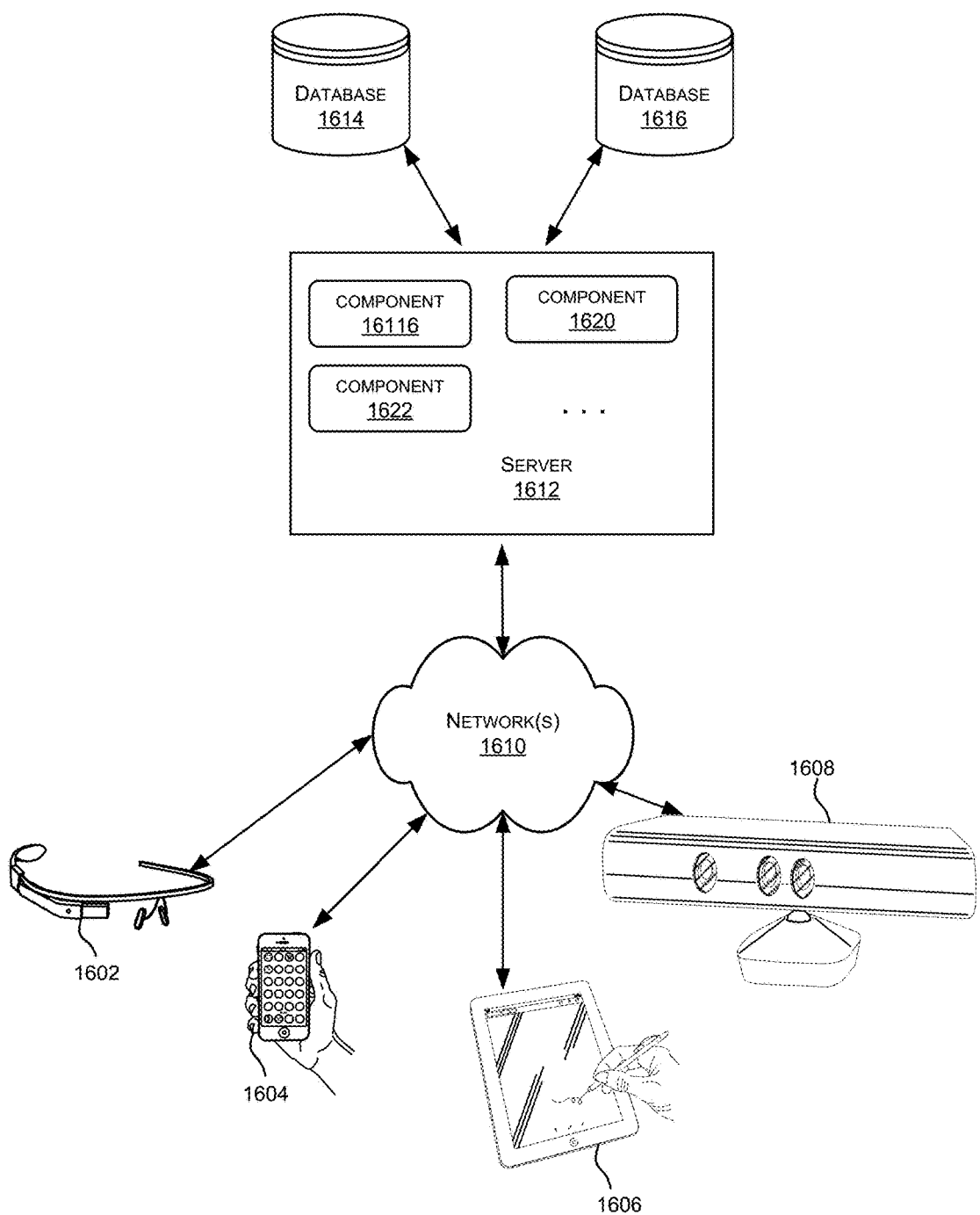
FIG. 16 depicts a simplified diagram of a distributed system for implementing one of the embodiments.

FIG. 16 depicts a simplified diagram of a distributed system 1600 for implementing one of the embodiments. In the illustrated embodiment, distributed system 1600 includes one or more client computing devices 1602, 1604, 1606, and 1608, which are configured to execute and operate a client application such as a web browser, proprietary client (e.g., Oracle Forms), or the like over one or more network(s) 1610. Server 1612 may be communicatively coupled with remote client computing devices 1602, 1604, 1606, and 1608 via network 1610.

In various embodiments, server 1612 may be adapted to run one or more services or software applications provided by one or more of the components of the system. In some embodiments, these services may be offered as web-based or cloud services or under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in the figure, the software components 1618, 1620 and 1622 of system 1600 are shown as being implemented on server 1612. In other embodiments, one or more of the components of system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in the figure is thus one example of a distributed system for implementing an embodiment system and is not intended to be limiting.

Client computing devices 1602, 1604, 1606, and/or 1608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 17, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1602, 1604, 1606, and 1608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1610.

Although exemplary distributed system 1600 is shown with four client computing devices, any number of client computing devices may be supported. Other devices, such as devices with sensors, etc., may interact with server 1612.

Network(s) 1610 in distributed system 1600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1610 can be a local area network (LAN), such as one based on Ethernet, Token-Ring and/or the like. Network(s) 1610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1602.11 suite of protocols, Bluetooth®, and/or any other wireless protocol); and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1612 may be adapted to run one or more services or software applications described in the foregoing disclosure. For example, server 1612 may correspond to a server for performing processing described above according to an embodiment of the present disclosure.

Server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more databases 1614 and 1616. Databases 1614 and 1616 may reside in a variety of locations. By way of example, one or more of databases 1614 and 1616 may reside on a non-transitory storage medium local to (and/or resident in) server 1612. Alternatively, databases 1614 and 1616 may be remote from server 1612 and in communication with server 1612 via a network-based or dedicated connection. In one set of embodiments, databases 1614 and 1616 may reside in a storage-area network (SAN). Similarly, any necessary files for performing the functions attributed to server 1612 may be stored locally on server 1612 and/or remotely, as appropriate. In one set of embodiments, databases 1614 and 1616 may include relational databases, such as databases provided by Oracle, which are adapted to store, update, and retrieve data in response to SQL-formatted commands.

Figure 17:
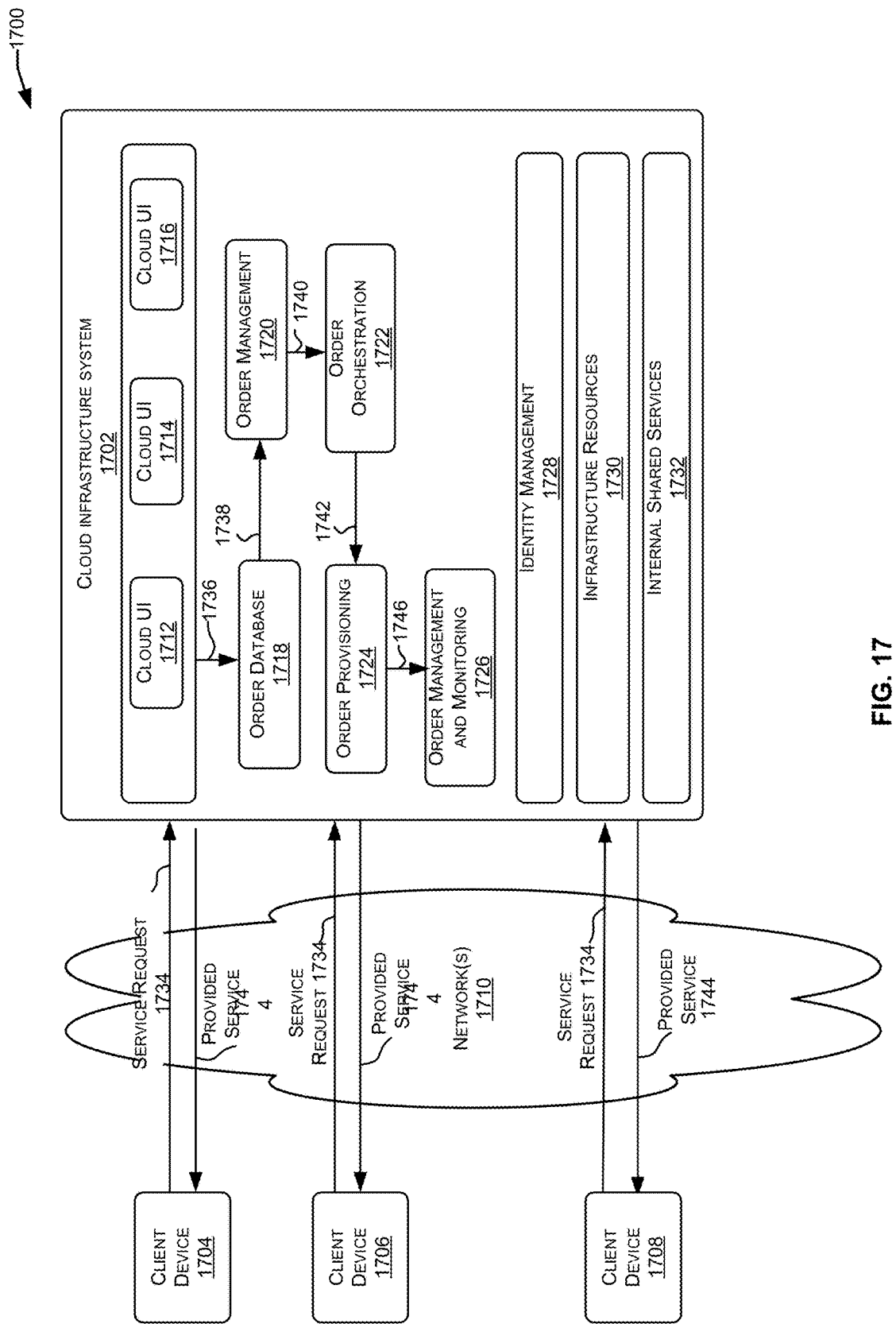
FIG. 17 is a simplified block diagram of components of a system environment by which services provided by the components of an embodiment system may be offered as cloud services, in accordance with an embodiment of the present disclosure.

FIG. 17 is a simplified block diagram of one or more components of a system environment 1700 by which services provided by one or more components of an embodiment system may be offered as cloud services, in accordance with an embodiment of the present disclosure. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the embodiment shown in the figure is only one example of a cloud infrastructure system that may incorporate an embodiment of the invention. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1602, 1604, 1606, and 1608.

Although exemplary system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network familiar to those skilled in the art that can support data communications using any of a variety of commercially-available protocols, including those described above for network(s) 1610.

Cloud infrastructure system 1702 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform.

In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in the figure, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In exemplary operation 1734, a customer using a client device, such as client device 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI), cloud UI 1712, cloud UI 1714 and/or cloud UI 1716 and place a subscription order via these UIs. The order information received by cloud infrastructure system 1702 in response to the customer placing an order may include information identifying the customer and one or more services offered by the cloud infrastructure system 1702 that the customer intends to subscribe to.

After an order has been placed by the customer, the order information is received via the cloud UIs, 1712, 1714 and/or 1716.

At operation 1736, the order is stored in order database 1718. Order database 1718 can be one of several databases operated by cloud infrastructure system 1718 and operated in conjunction with other system elements.

At operation 1738, the order information is forwarded to an order management module 1720. In some instances, order management module 1720 may be configured to perform billing and accounting functions related to the order, such as verifying the order, and upon verification, booking the order.

At operation 1740, information regarding the order is communicated to an order orchestration module 1722. Order orchestration module 1722 may utilize the order information to orchestrate the provisioning of services and resources for the order placed by the customer. In some instances, order orchestration module 1722 may orchestrate the provisioning of resources to support the subscribed services using the services of order provisioning module 1724.

In certain embodiments, order orchestration module 1722 enables the management of business processes associated with each order and applies business logic to determine whether an order should proceed to provisioning. At operation 1742, upon receiving an order for a new subscription, order orchestration module 1722 sends a request to order provisioning module 1724 to allocate resources and configure those resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. Order orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706 and/or 1708 by order provisioning module 1724 of cloud infrastructure system 1702.

At operation 1746, the customer's subscription order may be managed and tracked by an order management and monitoring module 1726. In some instances, order management and monitoring module 1726 may be configured to collect usage statistics for the services in the subscription order, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.) Identity management module 1728 may also include the management of descriptive information about each customer and about how and by whom that descriptive information can be accessed and modified.

Figure 18:
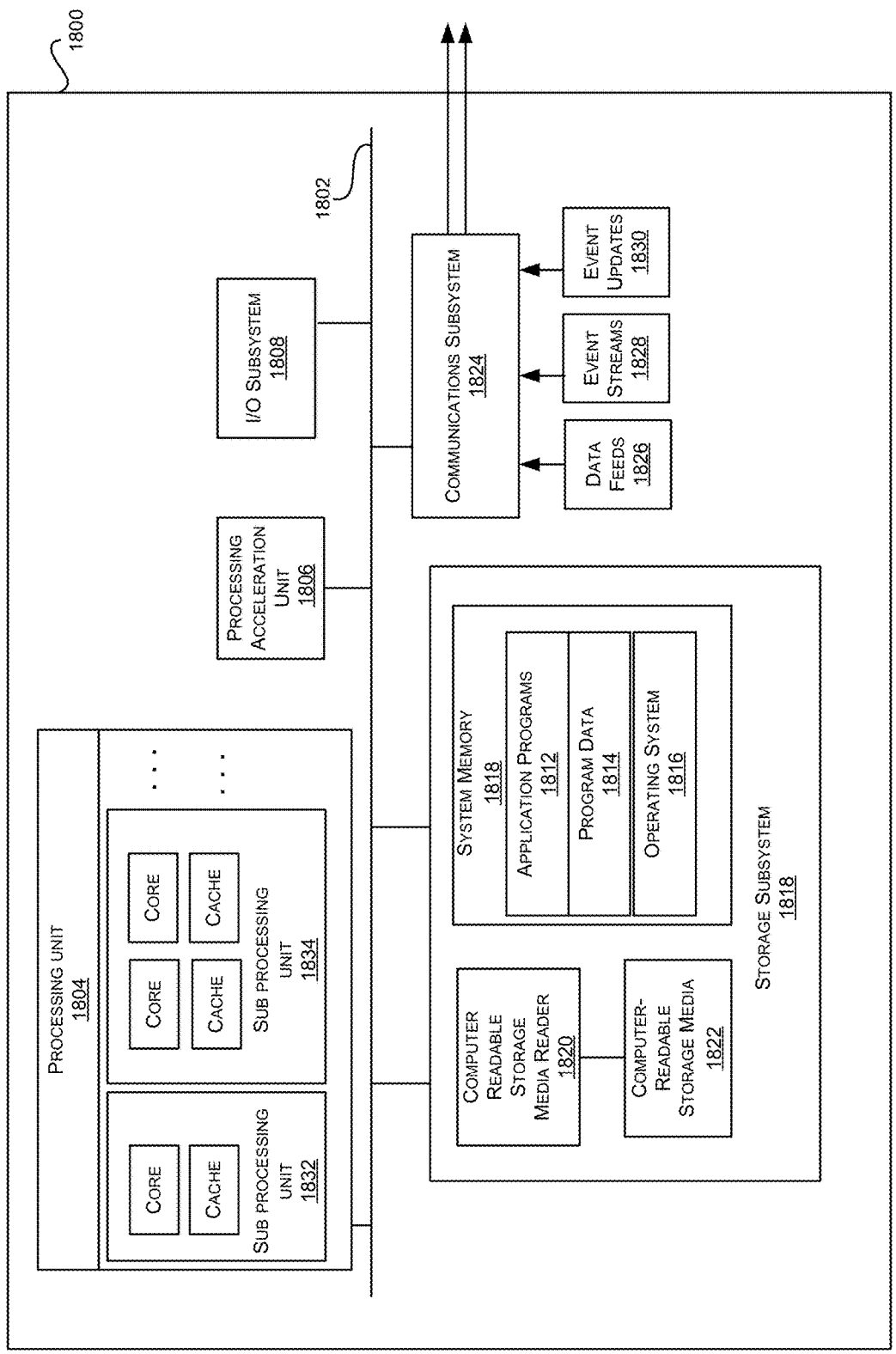
FIG. 18 illustrates an example of a computer system in which various embodiments of the present invention may be implemented.

FIG. 18 illustrates an example computer system 1800 in which various embodiments of the present invention may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 18 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with the present invention.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1602.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by one or more processors and from a service associated with a data store, an application programming interface (API) particular to the data store;
   making, by the one or more processors, one or more API calls associated with the received API particular to the data store, the one or more API calls configured to request an event stream that includes source events from the data store;
   displaying, by the one or more processors, a graph that includes a plurality of first points representing a plurality of first events from the event stream and a plurality of second points representing a plurality of second events from the event stream;
   receiving, by the one or more processors, a first event of the plurality of first events from the event stream;
   in response to receiving the first event, plotting, in the graph, a first point corresponding to the first event with a first color that visually distinguishes the first point from at least a one other color associated with a remainder of the plurality of points;
   receiving, by the one or more processors, a second event of the plurality of second events from the event stream;
   in response to receiving the second event:
      determining a correlation coefficient between the first event and the second event;
      determining a correlation color corresponding to the correlation coefficient; and
      plotting, in the graph, a second point corresponding to the second event with the correlation color;
   receiving, by the one or more processors, a third event of the plurality of first events from the event stream; and
   in response to receiving the third event:
      plotting, in the graph, a third point corresponding to the third event with the first color; and
      changing a color of the first point to match the at least one other color associated with the remainder of the plurality of points.

2. The method of claim 1, wherein the graph comprises a scatter plot.

3. The method of claim 1, wherein the X-axis or the Y-axis of the graph are based at least in part on a property of the plurality of events from the event stream.

4. The method of claim 3, further comprising receiving identification of the property from a user associated with the event stream.

5. The method of claim 3, further comprising selecting the property based at least in part on an order of output of the event stream.

6. The method of claim 5, wherein the property comprises a numeric value.

7. The method of claim 3, wherein the Y-axis represents a response variable.

8. The method of claim 1, wherein a size of each of the plurality of points is based at least in part on a respective property of each of the plurality of events from the event stream.

9. The method of claim 1, further comprising removing a number of the plurality of points from the graph, the number based at least in part on a visual characteristic of the graph.

10. The method of claim 1, wherein the graph comprises a scatter plot in which one axis represents a time of a particular event and another axis represents a value of the particular event, wherein the plurality of events of the event stream are received over a time interval, and the method further comprises:
   plotting a point that corresponds to the particular event;
   determining a revised smoothed curve fitter based at least in part on points contained in the scatter plot; and
   re-drawing the revised smoothed curve fitter in the scatter plot.

11. The method of claim 1, wherein the graph comprises a scatter plot in which one axis represents a time of a particular event and another axis represents a value of the particular event, wherein the plurality of events of the event stream are received over a time interval, and the method further comprises:
   plotting a point that corresponds to the particular event;
   determining one or more clusters of points contained in the scatter plot; and
   re-drawing, on the scatter plot, one or more shapes that represent the one or more clusters and that include points belonging to those clusters.

12. A non-transitory computer-readable medium storing computer-executable instructions that, when executed by one or more processors, configures one or more computer systems to perform at least:
   instructions that cause the one or more processors to receive, from a service associated with a data store, an application programming interface (API) particular to the data store;
   instructions that cause the one or more processors to make one or more API calls associated with the received API particular to the data store, the one or more API calls configured to request an event stream that includes source events from the data store;
   instructions that cause the one or more processors to display a graph that includes a plurality of first points representing a plurality of first events from the event stream and a plurality of second points representing a plurality of second events from the event stream;
   instructions that cause the one or more processors to receive a first event of the plurality of first events from the event stream;
   instructions that cause the one or more processors to plot, in the graph, a first point corresponding to the first event with a first color that visually distinguishes the first point from at least a one other color associated with a remainder of the plurality of points in response to receiving the first event;
   instructions that cause the one or more processors to receive a second event of the plurality of second events from the event stream;
   instructions that cause the one or more processors to, in response to receiving the second event:
      determine a correlation coefficient between the first event and the second event;

determine a correlation color corresponding to the correlation coefficient; and plot, in the graph, a second point corresponding to the second event with the correlation color;

instructions that cause the one or more processors to receive a third event of the plurality of first events from the event stream; and instructions that cause the one or more processors to plot, in the graph, a third point corresponding to the third event with the first color and change a color of the first point to match the at least one other color associated with the remainder of the plurality of points in response to receiving the second event.

13. The non-transitory computer-readable medium of claim 12, wherein the one or more computer systems are further configured to perform instructions that cause the one or more processors to receive identification, from a user, of a property of the plurality of events from the event stream.

14. The non-transitory computer-readable medium of claim 13, wherein the property is utilized to represent values of the X-axis or the Y-axis of the graph.

15. The non-transitory computer-readable medium of claim 13, wherein the property comprises a non-numeric value.

16. The non-transitory computer-readable medium of claim 12, wherein a size of each of the plurality of points is based at least in part on a respective property of each of the plurality of events from the event stream.

17. A system, comprising:
a memory storing a plurality of instructions; and
a processor configured to access the memory, the processor further configured to execute the plurality of instructions to at least:
receive, from a service associated with a data store, an application programming interface (API) particular to the data store;
make one or more API calls associated with the received API particular to the data store, the one or more API calls configured to request an event stream that includes source events from the data store;
display a graph that includes a plurality of first points representing a plurality of first events from the event stream and a plurality of second points representing a plurality of second events from the event stream;
receive a first event of the plurality of first events from the event stream;
in response to receiving the first event, plot, in the graph, a first point corresponding to the first event with a first color that visually distinguishes the first point from at least a one other color associated with a remainder of the plurality of points;
receive a second event of the plurality of second events from the event stream;
in response to receiving the second event:
determine a correlation coefficient between the first event and the second event;
determine a correlation color corresponding to the correlation coefficient; and
plot, in the graph, a second point corresponding to the second event with the correlation color;
receive a third event of the plurality of first events from the event stream; and
in response to receiving the third event:
plot, in the graph, a third point corresponding to the third event with the first color; and
change a color of the first point to match the at least one other color associated with the remainder of the plurality of points.

18. The system of claim 17, wherein the processor is further configured to execute the plurality of instructions to at least remove a number of the plurality of points from the graph, the number based at least in part on a visual characteristic of the graph.

19. The system of claim 17, wherein the graph comprises a scatter plot in which one axis represents a time of a particular event and another axis represents a value of the particular event, wherein the plurality of events of the event stream are received over a time interval, and wherein the processor is further configured to execute the plurality of instructions to at least:
plot a point that corresponds to the particular event;
determine a revised smoothed curve fitter based at least in part on points contained in the scatter plot; and
re-draw the revised smoothed curve fitter in the scatter plot.

20. The system of claim 17, wherein the graph comprises a scatter plot in which one axis represents a time of a particular event and another axis represents a value of the particular event, wherein the plurality of events of the event stream are received over a time interval, and wherein the processor is further configured to execute the plurality of instructions to at least:
plot a point that corresponds to the particular event;
determine one or more clusters of points contained in the scatter plot; and
re-draw, on the scatter plot, one or more shapes that represent the one or more clusters and include points belonging to those clusters.

\* \* \* \* \*

UNITED STATES PATENT AND TRADEMARK OFFICE
CERTIFICATE OF CORRECTION

PATENT NO. : 10,217,256 B2
APPLICATION NO. : 15/936037
DATED : February 26, 2019
INVENTOR(S) : de Castro Alves et al.

It is certified that error appears in the above-identified patent and that said Letters Patent is hereby corrected as shown below:

On the Title Page

Column 2, item (57) under Abstract, Line 15, delete "be for determined." and insert -- be determined. --, therefor.

In the Specification

In Column 9, Line 65, delete "network1," and insert -- network2, --, therefor.

In Column 10, Line 14, after "{e2(p1,1)})})" insert -- : --.

In Column 10, Lines 16-17, after "{e3(p1,2)})})" insert -- : --.

In Column 12, Line 30, delete "{machine)}" and insert -- {machine1} --, therefor.

In Column 13, Line 31, delete "put( )" and insert -- put( )) --, therefor.

In Column 20, Line 33, delete "(ckj-xij)/-1" and insert -- (ckj-xij)/ | ck | -1 --, therefor.

In Column 21, Line 54, after "HBaseConfiguration( )" insert -- ; --.

In Column 21, Line 56, delete "Qualifierl" and insert -- Qualifier1 --, therefor.

In Column 22, Line 21, after "table)" insert -- . --.

In Column 22, Line 31, delete "cq1-" and insert -- cql- --, therefor.

In Column 22, Line 62, delete ""email">" and insert -- "email"/> --, therefor.

In Column 23, Line 38, delete "cq1-" and insert -- cql- --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*

In Column 25, Line 62, after "rowkey<" insert -- 15 --.

In Column 26, Line 22, delete "cq1-" and insert -- cql- --, therefor.